US012719340B2

(12) United States Patent
Witt

(10) Patent No.: US 12,719,340 B2
(45) Date of Patent: Aug. 25, 2026

(54) METHOD FOR PRODUCING A WINDING FOR A STATOR OF AN ELECTRIC ROTATING MACHINE, STATOR, METHOD FOR PRODUCING THE STATOR, AND ELECTRIC ROTATING MACHINE

(71) Applicant: Schaeffler Technologies AG & Co. KG, Herzogenaurach (DE)

(72) Inventor: Holger Witt, Buhl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 230 days.

(21) Appl. No.: 18/030,808

(22) PCT Filed: Sep. 28, 2021

(86) PCT No.: PCT/DE2021/100784
§ 371 (c)(1),
(2) Date: Apr. 7, 2023

(87) PCT Pub. No.: WO2022/073546
PCT Pub. Date: Apr. 14, 2022

(65) Prior Publication Data

US 2023/0369953 A1 Nov. 16, 2023

(30) Foreign Application Priority Data

Oct. 7, 2020 (DE) ........................ 102020126246.9

(51) Int. Cl.
*H02K 15/043* (2025.01)
*H02K 3/28* (2006.01)
*H02K 21/24* (2006.01)

(52) U.S. Cl.
CPC ........... *H02K 15/0433* (2025.01); *H02K 3/28* (2013.01); *H02K 21/24* (2013.01)

(58) Field of Classification Search
CPC ........... H02K 15/0433; H02K 15/0485; H02K 21/24; H02K 3/12; H02K 3/28
See application file for complete search history.

(56) References Cited

U.S. PATENT DOCUMENTS 6,281,614 B1 8/2001 Hill
6,348,751 B1 2/2002 Jermakian et al.
2003/0189388 A1 10/2003 Hashimoto et al.
2013/0014381 A1* 1/2013 Kayukawa ......... H02K 15/0433 29/596

(Continued)

FOREIGN PATENT DOCUMENTS

CN 103166391 A 6/2013
DE 60125436 T2 10/2007

(Continued)

*Primary Examiner* — Christopher M Koehler
*Assistant Examiner* — Ethan Nguyen Vo
(74) *Attorney, Agent, or Firm* — Volpe Koenig

(57) ABSTRACT

A method for producing a winding for a stator of an electric rotating machine, the stator itself, a method for producing the stator, and an electric rotating machine. In the method for producing a winding for a stator of an electric rotating machine, a plurality of conductors are provided and are wound on a first fin along a first winding direction, so that the conductors loop around the first fin, and the first fin is then removed from the resultant winding of the conductors.

15 Claims, 22 Drawing Sheets

(56) References Cited

U.S. PATENT DOCUMENTS

2019/0252930 A1 8/2019 Stetina et al.
2019/0260249 A1* 8/2019 Oka ........................ H02K 1/32

FOREIGN PATENT DOCUMENTS

JP 2010200547 A * 9/2010
WO WO-2019166061 A1 * 9/2019 ......... H02K 15/0478
WO 2020104683 A1 5/2020

* cited by examiner 20
22
31
32
33
35
40
51
52
53
54
60
61
62
63
64
70

METHOD FOR PRODUCING A WINDING FOR A STATOR OF AN ELECTRIC ROTATING MACHINE, STATOR, METHOD FOR PRODUCING THE STATOR, AND ELECTRIC ROTATING MACHINE

CROSS-REFERENCE TO RELATED APPLICATIONS

This application is the U.S. National Phase of PCT Appln. No. PCT/DE2021/100784, filed Sep. 28, 2021, which claims the benefit of German Patent Appln. No. 102020126246.9, filed Oct. 7, 2020, the entire disclosures of which are incorporated by reference herein.

TECHNICAL FIELD

The disclosure relates to a method for producing a winding for a stator of an electric rotating machine, the stator itself, a method for producing the stator, and an electric rotating machine.

BACKGROUND

The electric drive train of motor vehicles is known from the prior art. This consists of components for energy storage, energy conversion and energy transmission. The components for energy conversion include radial flux machines and axial flux machines.

However, radial flux machines often only have one operating point at which they have the best efficiency. Accordingly, they are not designed to adjust the operating point as a function of the changing requirements placed on them and thereby achieve the highest efficiency in accordance with the different requirements of the different operating parameters or at different operating points.

In order to overcome this disadvantage, electric rotating machines that are adapted to the requirements that arise in terms of their operating range are often used, or the disadvantage mentioned is compensated for by coupling the electric rotating machine to a transmission unit or by integrating a transmission unit into the electric rotating machine, such as with an electric axle.

Axial flux machines are known from the prior art in various designs with one or more stators and one or more rotors.

An electrical axial flux machine, also referred to as a transverse flux machine, is a motor or generator in which the magnetic flux between a rotor and a stator is realized parallel to the axis of rotation of the rotor. Other names for electric axial flux machines are also brushless DC motors, permanently excited synchronous motors or disc motors.

Such an axial flux machine can be designed in designs that differ in the arrangement of the rotor and/or stator and can have different special features and advantages when used, for example as a traction machine for a vehicle.

Axial flux machines exist with different winding forms. A common form of winding is the single-tooth winding. Although single-tooth windings form small winding overhangs, they generate a magnetic field with a high proportion of harmonics, i.e., waves with a different frequency than the number of turns of the rotor of the axial flux machine, which negatively influence the acoustics and the efficiency. Axial flux machines with distributed windings have the advantage that the aforementioned disadvantages do not occur, or only to a reduced extent. However, the end windings of these distributed windings require a large amount of space in the axial and/or radial direction.

Large winding overhangs are not desirable, especially in axial flux machines, since they limit the maximum diameter of the active components in the event of radial expansion, which reduces the maximum torque that can be made available. A relatively large axial extension of the end windings results in a larger axial length of the entire electric rotating machine, which is also undesired.

In order to explain the prior art, specific embodiments are discussed below.

U.S. Pat. No. 6,348,751 B1 discloses an electric motor with active hysteresis control of winding currents and/or with an efficient stator winding arrangement and/or an adjustable air gap to form an axial flux machine. A stator of this electric motor comprises a plurality of segments in a plurality of stator teeth, which are entwined in a serpentine manner with corresponding segments of windings, which are implemented in a plurality of planes. Each phase occupies a respective peripheral area of the stator.

US 2003/0189388 A1 discloses an assembly that has an axial flux machine that includes a stator and a rotor. The stator has a plurality of axially aligned stator teeth which are separated from one another by grooves. Windings of a stator winding run around the stator teeth. It can be seen that the winding overhangs have a relatively large volume requirement in the axial and/or radial direction.

US 2019/0252930 A1 relates to a stator arrangement for an axial flux machine and an axial flux machine with such a stator arrangement. The stator assembly comprises a stator having a plurality of stator teeth which are distributed concentrically in the circumferential direction and are arranged separated in the axial direction from a rotor by an air gap, wherein the stator teeth comprise two end sections opposite in the axial direction and a tooth core between the end sections, and wherein each tooth core has a core cross-sectional area and is wrapped with at least one coil winding. Corresponding single-tooth windings are provided here.

In the case of the windings used, the individual windings are often interwoven with one another, so that bending the individual conductors separately and then bringing them together in a braiding requires a great deal of machinery and time.

SUMMARY

Proceeding from this, the object of the present disclosure is to provide a method for producing a winding for a stator of an electrical rotating machine, and the stator itself, as well as the method for producing the stator and the electric rotating machine that provide solutions that make it possible to produce the winding and correspondingly also the stator comprising the winding, as well as the electric rotating machine comprising the stator, at low cost and with only a small time requirement.

This object is achieved by the method for producing a winding for a stator according to claim 1, by the stator of an electric rotating machine according to claim 7, by the method for producing the stator according to claim 8 and by the electric rotating machine according to claim 9.

Advantageous embodiments of the method according to the disclosure for producing a winding are specified in the dependent claims 2-6. An advantageous embodiment of the electric rotating machine is specified in the dependent claim 10.

The features of the claims can be combined in any technically useful manner, wherein the explanations from the following description as well as features from the figures can also be consulted for this purpose, which comprise supplementary embodiments of the disclosure.

The disclosure relates to a method for producing a winding for a stator of an electric rotating machine, in which a plurality of conductors are provided and the conductors are wound on a first fin along a first winding direction, so that the conductors wrap around the first fin. The first fin is then removed, e.g., pulled out, from the coil of conductors created thereby.

In particular, the method is used to produce a winding for a stator of an axial flux machine, although the production of a winding for a radial flux machine should not be ruled out. A respective winding direction runs in a rotation essentially around the longitudinal axis of the first fin.

An advantageous embodiment of the method provides that the conductor pairs are wound on a first fin along a first winding direction, such that the conductors wrap around the first fin, and after a specified number of windings has been reached along a second winding direction, which is opposite to the first winding direction, a second fin such that the conductors partially wrap around the second fin with connecting transition sections. Thereafter, the conductors are wound on a third fin along the first winding direction, so that the conductors wrap around the third fin. Then the fins can be removed from the thereby created windings of the conductor pairs, e.g., by being pulled out.

Here, too, a respective winding direction runs in a rotation essentially around the longitudinal axis of the relevant fin.

A fin is understood here to mean an elongate shaped element which, in particular, gives the inner contour to the wrap of the conductors or the winding produced thereby. The cross-section of the second fin can have a geometry that deviates from the cross-section of the first fin or the third fin, in particular in the area that is not used for wrapping the conductors. Furthermore, it is sufficient if the second fin is designed to be significantly shorter than the other two fins. The sections of the conductors bent by the bend at or on the second fin are also referred to as connecting transition sections, which form a so-called layer jump. These are used, when the winding is arranged on a stator body, to connect linear sections of the conductors that run in grooves in the starter body to one another and, in the process, to wrap around groups of stator teeth.

In particular, the first fin and the third fin may each have a cross-sectional shape that has a first wrap side and a second wrap side, wherein the first wrap side is longer than the second wrap side.

The two wrap sides can be connected to one another, such that fins are made available, each of which essentially forms a wedge shape in profile. By wrapping the wrap sides of the fins with the conductors, the windings created thereby— when projecting the windings into a plane—have a zigzag shape. If the zigzag course is equated with an oscillation, the pointed corner areas of the zigzag shape correspond to minima and maxima of the oscillation and thus to the extreme value areas.

Correspondingly, a respective conductor forms a three-dimensional spiral or a screw thread shape, with angular areas in the extreme values. These areas in the extreme values can also be referred to as connecting conductor sections.

The linear sections are connected to each other by areas of the respective conductor that form the extreme values. These areas forming the extreme values are the areas of the relevant conductor which, when the winding produced is later arranged on a stator body and running in grooves between stator teeth, enclose the stator teeth on their radial inner side or one of their radial outer sides and consequently linear sections to be arranged in grooves of a stator body connect the conductors together.

The linear sections, together with the connecting conductor pieces, form a respective wrap of at least one stator tooth.

The bending of the conductors on the second fin can be realized with an angle of wrap of 100° to 220° on the second fin.

A further embodiment of the method provides that the connecting transition sections are deformed in such a way that the substantially helically shaped windings of the conductors are each positioned between two mutually parallel planes. This is intended to give the braiding produced a substantially flat, disk-like shape. When using the method for producing a winding for a stator of an electric radial flux machine, a mat-like or elongated surface shape with gradations in the transition sections can be produced.

This ensures that the individual conductors are ultimately positioned in several planes that run parallel to one another. In this way, conductors can be arranged in several planes on the stator body.

Furthermore, the method according to the disclosure can also have the step in that after positioning the windings of the conductors between two planes running parallel to one another, the braiding produced is reduced in thickness perpendicular to the juxtaposition produced and/or is bent so that it is circular.

In other words, the braiding produced is flattened in order to reduce its axial extent when arranged between stator teeth of an axial flux machine. During this flattening, the spatially formed meshes are compressed, so that the braiding has a reduced thickness.

As a result of the compression, in particular areas of the respective conductor that form the extreme values are compressed, so that the braiding has a smaller thickness, in particular in these sections.

The bending of the braiding produced in a circular shape can be carried out before or after the reduction in thickness.

According to a further aspect, the disclosure relates to a stator of an electric rotating machine, comprising a stator body which has a plurality of stator teeth arranged along a circumferential direction and grooves formed between the stator teeth, and conductor sections of a winding produced according to the disclosure arranged in the grooves. In this case, conductor sections of the conductors are arranged in a respective groove. The conductors, deviating from a winding direction, that essentially runs in the circumferential direction, meander in the radial direction in a direction that runs substantially perpendicular to the circumferential direction, and each wrap around a group of stator teeth with a respective wrap formed thereby.

The vertical direction can also be understood to mean a direction of 60°-120° in relation to an ideal tangent to the circumferential direction. In addition, the course in this direction can also be curved or designed with at least one slight kink.

The stator is in particular a stator of an axial flux machine. The stator body can also be referred to as the stator yoke, on which a number of axially protruding stator teeth are arranged.

The conductors of a conductor pair that are connected to a respective phase are configured to be polarized differently, starting from a common connection area.

A further aspect of the present disclosure is a method for producing a stator of an electric rotating machine according to the disclosure, in which a stator body, which has a plurality of stator teeth arranged along a circumferential direction and grooves formed between the stator teeth, and a winding produced according to the disclosure are provided, and conductor sections of the conductors are arranged in the grooves so that the conductors form at least a portion of windings of the stator. In this case, at least one conductor section of the conductors is arranged in a respective groove in such a way that the conductors, deviating from a winding direction that essentially runs in the circumferential direction, meander in the radial direction in a direction that runs substantially perpendicular to the circumferential direction and each wrap around a group of stator teeth with a respective wrap formed thereby.

Here, too, the vertical direction can also be understood to mean a direction of 60°-120° in relation to an ideal tangent to the circumferential direction. In addition, the course in this direction can also be curved or designed with at least one slight kink.

Furthermore, the disclosure provides an electric rotating machine which has a rotor and at least one stator according to the disclosure.

In particular, this electric rotating machine is designed as an axial flux machine.

In particular, it is provided that the conductors of the phases are connected in a star wiring to corresponding contacts carrying current of the significant phase.

BRIEF DESCRIPTION OF THE DRAWINGS

Aspects of the disclosure described above are explained in detail below against the significant technical background with reference to the accompanying drawings, which show preferred embodiments. The disclosure is not limited in any way by the purely schematic drawings, wherein it should be noted that the embodiments shown in the drawings are not limited to the dimensions shown. In the drawings:

FIG. 15: shows fins with a plurality of windings arranged thereon in a perspective view;

FIG. 16: shows fins with a plurality of windings arranged thereon in a plan view;

DETAILED DESCRIPTION

First, the general structure of a stator according to the disclosure is explained with reference to FIGS. 1 and 2.

Figures 1, 2:
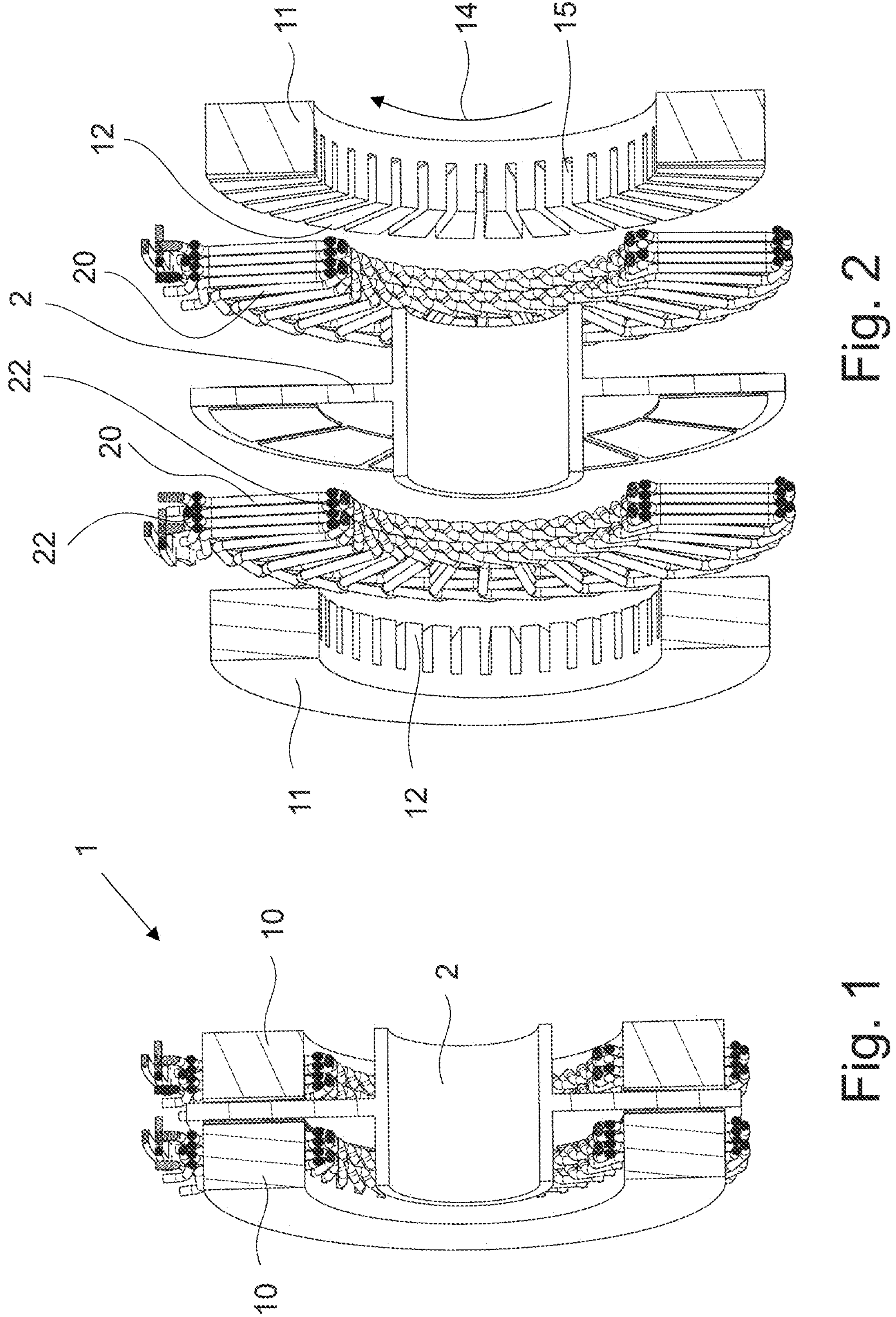
FIG. 1: shows an axial flux machine in an I arrangement in a perspective section.
FIG. 2: shows the axial flux machine in an I arrangement in an exploded view.

FIG. 1 shows an axial flux machine in an I arrangement with wave windings in a perspective section, which has a stator 10 on each side of a rotor 2. The respective stator 10 comprises a stator body 11 which comprises or forms a stator yoke. The stator body 11 or the stator 10 itself has a plurality of stator teeth 12 which are arranged along a circumferential direction 14 and extend in the axial direction. The stator teeth 12 are separated from one another by grooves 15.

The stator 10 also comprises one or more windings 20 of electrical conductors wrapped around the grooves 15 and stator teeth 12. These windings are placed on the stator teeth 12 along a general winding direction 21 that runs in the circumferential direction 14.

The windings 20 form end windings 22 on the radial inner side of the stator teeth 12 and on their radial outer side.

FIG. 2 shows the same construction as in FIG. 1 but in an exploded view. The rotor 2 is arranged centrally between two stators 10, wherein each stator 10 has a winding 20 which is designed as a wave winding.

However, the present disclosure is not limited to the illustrated design of an axial flux machine, but it can also be designed as an H-type, or one-sided axial flux machine with only one stator and only one rotor.

Figures 3, 4:
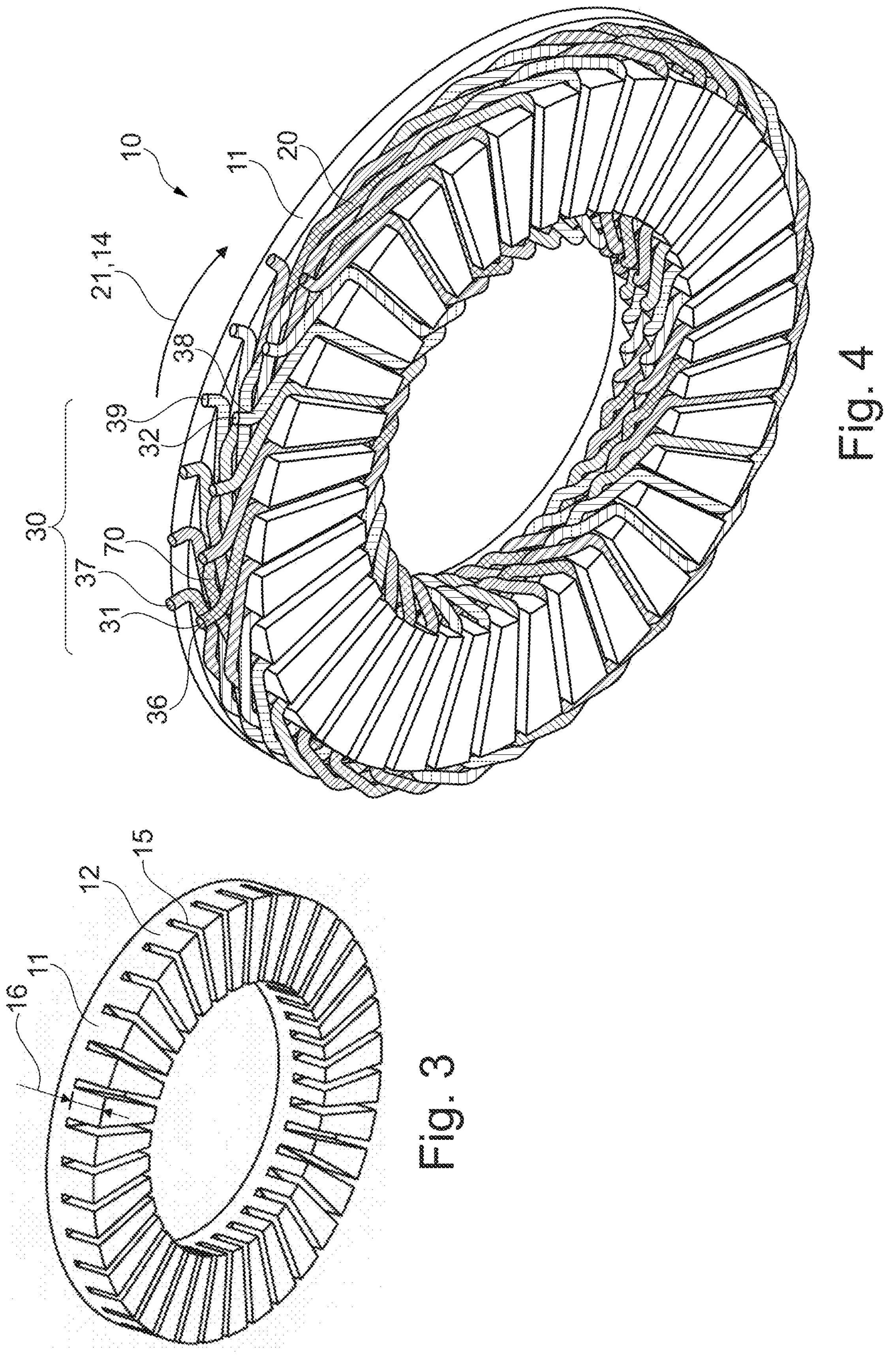
FIG. 3: shows a stator core in a perspective view.
FIG. 4: shows the stator core with windings.

FIG. 3 shows a perspective view of a stator body 11. The grooves 15 and their depth 16 are clearly visible here.

As shown in FIG. 4, the configuration of the stator according to the disclosure provides that linear conductor sections 33 of at least one conductor pair 30 are arranged in grooves 15, which form at least a proportion of windings 20 of the stator, wherein in a respective groove 15, linear conductor sections 33 of the conductor pair 30 are arranged offset in parallel to one another along the depth 16 of the groove 15, and the order of arrangement of the parallel conductor sections 33 in each groove 15 through which the conductors pass alternates along the circumferential direction 14.

A conductor pair is shown in FIG. 4 in the form of the first conductor 31 and the second conductor 32.

Deviating from the embodiment shown here, the linear conductor sections 33 can also be designed curved or saber-shaped. For conceptual clarification, however, conductor sections shaped in this way are also subsumed below under the term "linear conductor sections".

Figure 5:
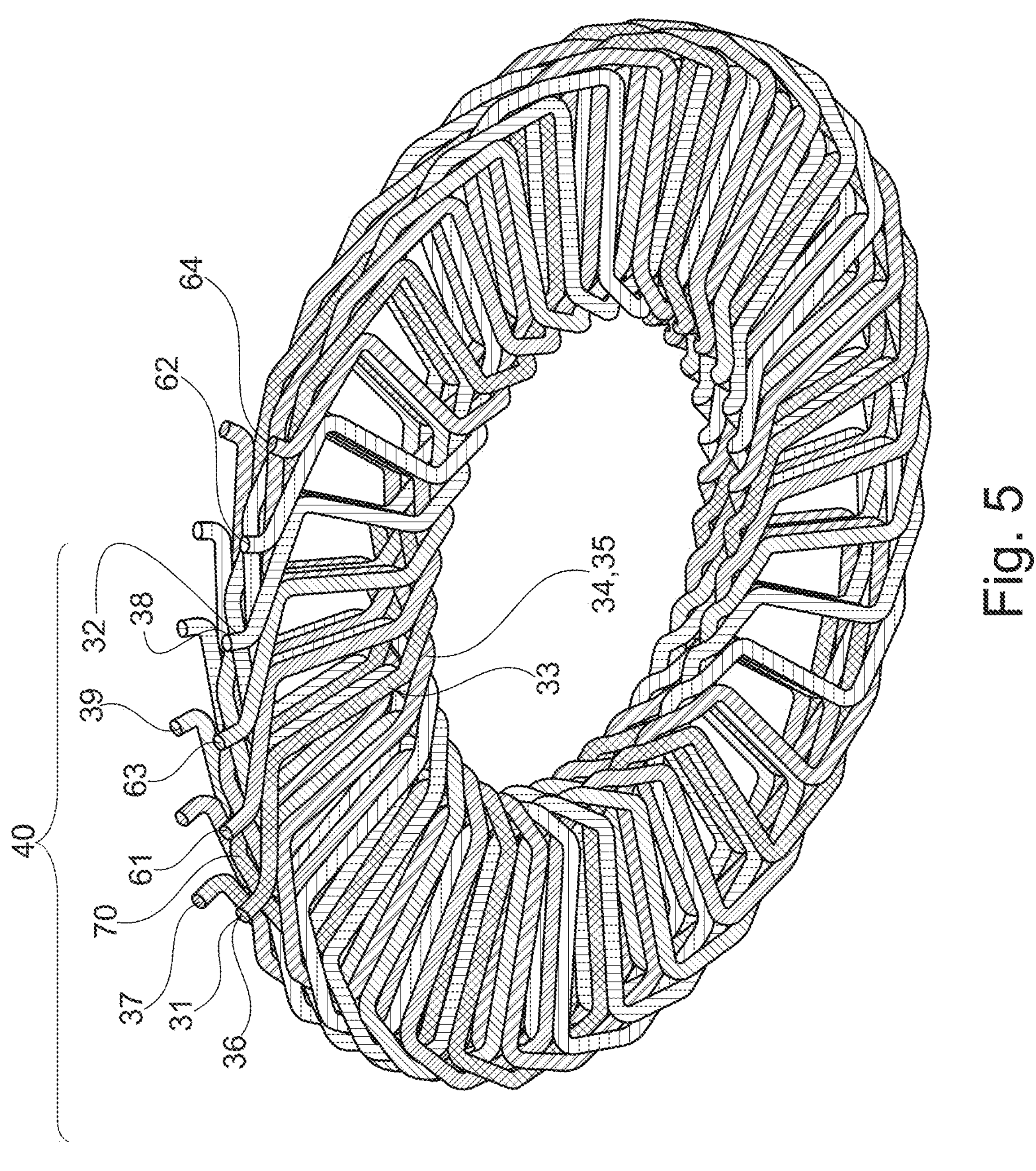
FIG. 5: shows a winding in a perspective view.

FIG. 4 shows that the conductors of the conductor pair 30 of the illustrated wave winding meander in a direction perpendicular to the circumferential direction 14 or in the radial direction, deviating from the winding direction 21 that essentially runs in the circumferential direction 14. This has the result that the conductors of the conductor pair 30 with loops 34, as illustrated in FIG. 5, each loop around a group of stator teeth 12.

Current flows through the conductors of the conductor pair 30 in different circumferential directions. This is explained using the first conductor pair 30.

A first conductor 31 of the conductor pair 30 is referred to as the positive conductor for this purpose. A second conductor 32 of the conductor pair 30 is referred to as the negative conductor for this purpose.

The first conductor 31 forms a first connection 36 of the positive conductor and a second connection 37 of the positive conductor.

The second conductor 32 forms a first connection 38 of the negative conductor and a second connection 39 of the negative conductor.

Said conductors are designed to be connected to three corresponding phases, with one positive winding and one negative winding per phase.

A respective conductor 31, 32 of the conductor pair 30 wraps around a group 13 of stator teeth 12 on different radial sides, such that the current flow in a respective common groove 15 takes place in both conductors 31, 32 along the same direction.

It can be seen here that the stator 10 not only comprises one conductor pair, but three conductor pairs, wherein a third conductor 61 and a fourth conductor 62 form the second conductor pair, and a fifth conductor 63 and a sixth conductor 64 form the third conductor pair.

However, only sections of conductors of a conductor pair are always arranged in a respective groove 15.

In addition, it can be seen from FIG. 4 that the conductors of a conductor pair alternate with regard to the axial order in which they are arranged in a groove 15.

For better clarification of the course of the conductors, FIG. 5 shows the winding assembly produced without the stator teeth.

All conductors are clearly visible here in a perspective view.

Furthermore, it can be seen that a respective conductor pair 30 loops around a group 13 of stator teeth 12 which each comprises three stator teeth 12.

Due to the alternating arrangement of the conductors of a respective conductor pair 30 in the grooves 15, it is necessary for these conductors to cross. For this purpose, the conductors form connecting conductor sections 35 that connect the linear conductor sections 35 to one another and ensure that the respective conductor runs back and forth between two arrangement planes between the grooves 15 in which the relevant conductor runs.

For the three phases shown, one phase occupies every third groove 15.

The axially first conductor layer in a significant groove 15 is alternately assigned a positive or a negative phase. A layer can also consist of several discrete individual wires.

The winding 20 with the formation of two so-called double layers 60 is shown in FIGS. 4 and 5. A double layer 60 designates the course of a conductor in two mutually parallel planes. Correspondingly, two double layers 60 comprise four planes.

In order to enable the conductors of the conductor pair 30 to run in the four planes, the conductors each form a transition section 70, as is shown by way of example using the first conductor 31. This transition section 70 allows the first conductor 31 to pass from a second plane to a third plane.

Such a transition section 70 is also referred to as a layer jump.

FIG. 6 once again shows the realized winding 20 in a side view. A common connection area 40 of the conductors implemented on the circumference is also clearly visible.

Figures 6, 7, 8, 9, 10:
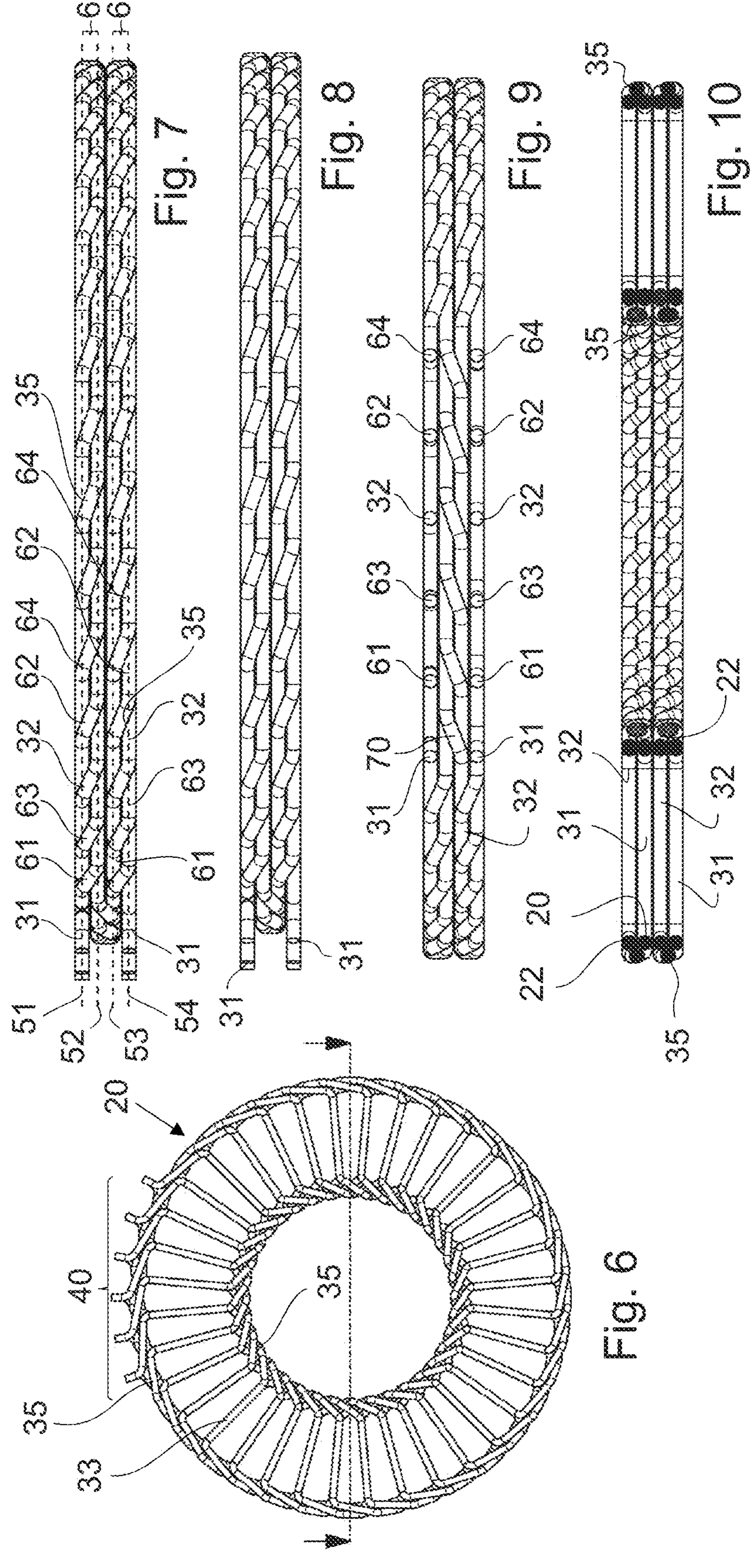
FIG. 6: shows a winding in a front view.
FIG. 7: shows a first side view of the winding.
FIG. 8: shows a second side view of the winding.
FIG. 9: shows a third side view of the winding.
FIG. 10: shows a sectional view along the line of the section indicated in FIG. 6.

FIG. 7 clearly shows the arrangement of the conductors 31, 61, 63, 32, 62, 64 in different planes, namely in a first plane 51, a second plane 52, a third plane 53 and a fourth plane 54.

Furthermore, the connecting conductor sections 35 can be seen here, which ensure that the conductors 31, 61, 63, 32, 62, 64 can switch between the first plane 51 and the second plane 52, and between the third plane 53 and the fourth plane 54.

FIG. 8 shows the same winding 20 in the same side view as FIG. 7, only without clarifying the course of the planes.

FIG. 9 shows a top view of the winding 20 shown in FIG. 6; here the transition sections 70 can be seen which bring the first conductor 31 and the second conductor 32 from the second plane 52 to the third plane 53.

FIG. 10 shows a sectional illustration according to the course of the section indicated in FIG. 6. Here, too, the connecting conductor sections 35 can be seen in section, which are used for crossing the conductors and at the same time form part of the winding overhangs 22.

It can also be seen here that the winding overhangs 22 can be designed in such a way that they are not or only slightly wider than the width of a groove 15 in question and accordingly have a small axial space requirement.

In addition, the winding overhangs 22 are also designed radially flat, so that axial flux machines equipped with them can realize a larger radius in the torque-active area.

This principle for designing a wave winding can also be used for radial flux machines.

A winding 20 with two double layers 60 is thus shown, which occupy a total of four layers or planes 51, 52, 53, 54 in the axial direction. An even number of layers or planes is required for this. Since two layers or planes each represent a common structure, two layers that belong together are referred to as a double layer 60.

The planes 51, 52, 53, 54 shown here do not necessarily have to be flat or even. For example, to follow a conical rotor, these planes 51, 52, 53, 54 could also be conical.

Figure 11:
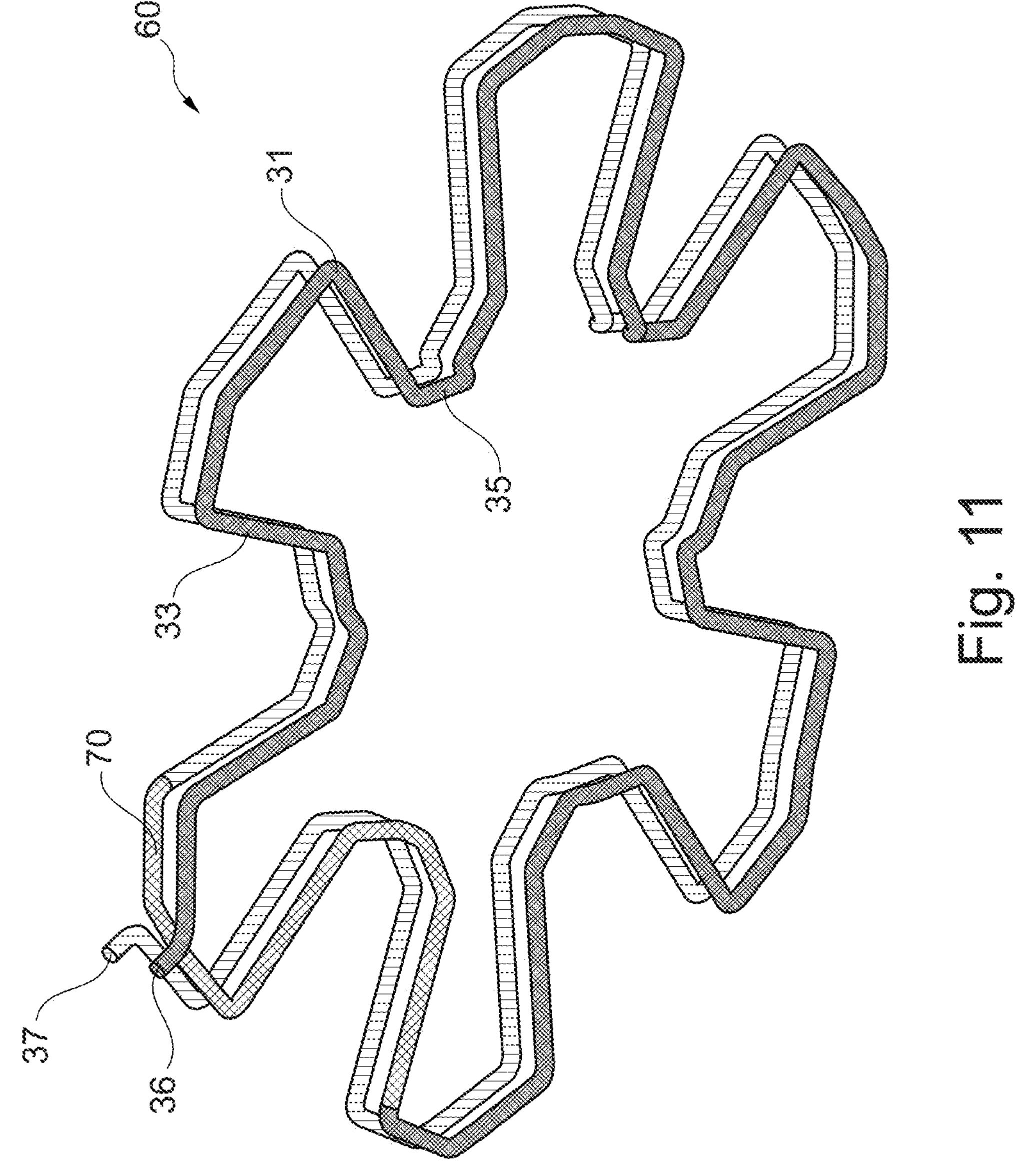
FIG. 11: shows a line element in a double layer.

In order to clarify a respective conductor course, FIG. 11 shows the first conductor 31 for one phase in a winding with two double layers in an individual, perspective representation. It can be seen that the linear sections 33 are each followed by connecting conductor sections 35 which guide the first conductor 31 back and forth between individual arrangement planes. After completing one turn, starting from a first connection 36, the first conductor 31 forms a transition section 70 which brings the first conductor 31 axially behind the already produced winding. There, the first conductor again runs in one turn until it ends at its second connection 37. The first connection 36 and the second connection 37 are substantially in the same angular area.

Figure 12:
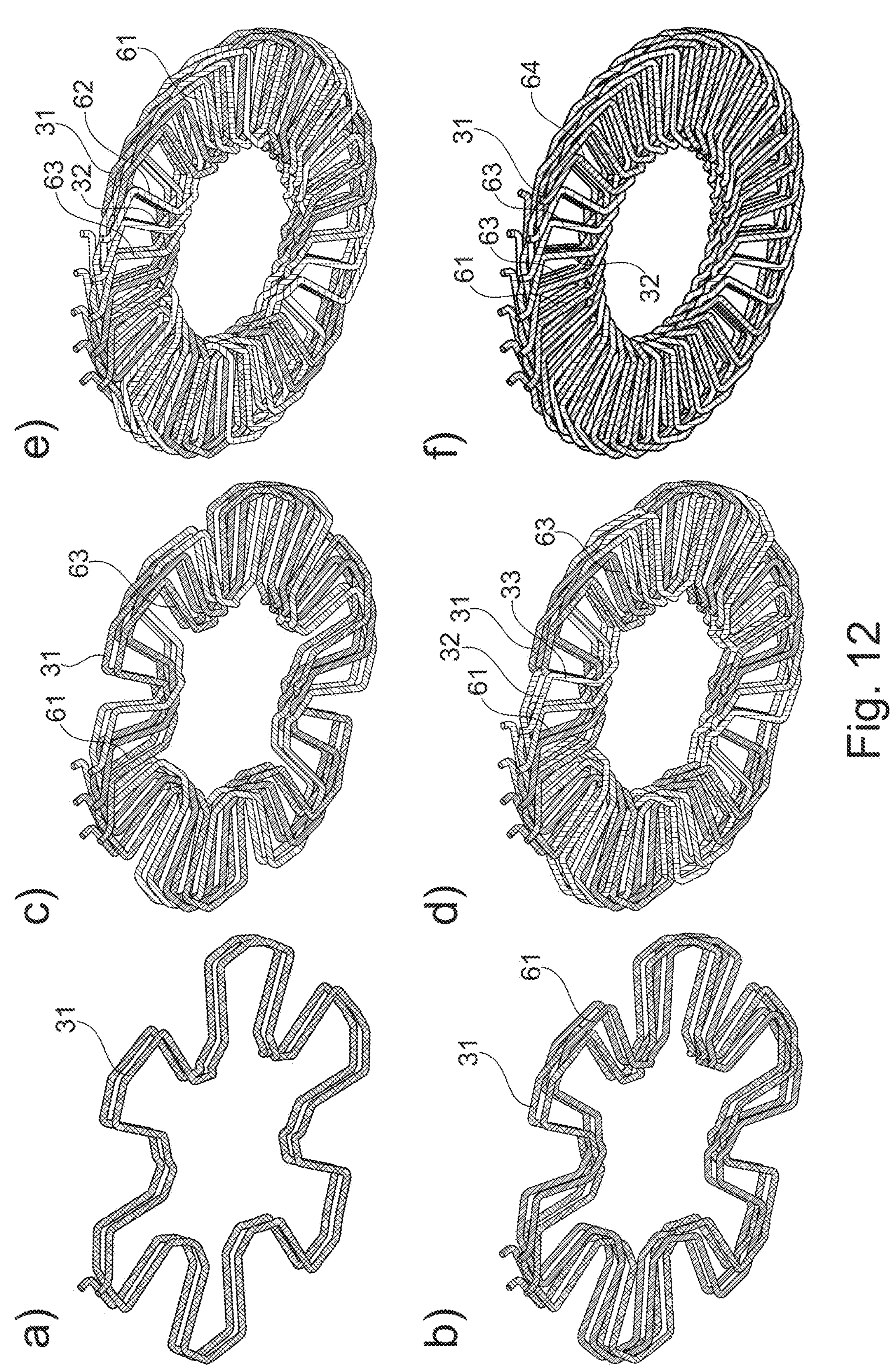
FIG. 12: shows in partial representations a) to f) the arrangement of individual line elements in the winding.

FIG. 12 shows the implementation of the overall winding in 6 partial representations a) to f).

Partial representation a) shows the first conductor 31, as has already been explained with reference to FIG. 11. Partial representation b) shows the first conductor 31 and a third conductor 61. Partial representation c) shows the first conductor 31, the third conductor 61 and a fifth conductor 63. For example, these conductors all form a so-called positive conductor of the respective phase. In addition to the conductors shown in partial representation c), partial representation d) now also shows the arrangement of the second conductor 32, which belongs to the same phase as the first conductor 31. As already described, it can also be seen here that linear conductor sections 33 of the first conductor 31 and of the second conductor 32 are arranged in such a way that they can be placed together in grooves.

Partial representation e) shows all the conductors already shown in partial representation d) and also a fourth conductor 62 which, together with the third conductor 61, forms a second conductor pair. Partial representation f) shows all the conductors already shown in partial representation e) and also a sixth conductor 64 which, together with the fifth conductor 63, forms a third conductor pair. In addition, partial representation f) shows that the end windings 22 are approximately as wide as the axial length required for the conductors in the grooves.

A winding 20 with two double layers 60 is shown in each of FIGS. 7 to 10, but the winding 20 can also consist of only one double layer or have more than two double layers. The second conductor 32, the fourth conductor 62 and the sixth conductor 64 each form the so-called negative conductor.

It can also be seen in FIGS. 6 to 10 that the linear conductor sections 33, which run in the grooves 15, are each connected by connecting conductor sections 35, which—when the stator is designed in an I arrangement—increase the radial distance to the stator core and at the same time bridge part of the distance to the next groove 15 belonging to the same phase in the circumferential direction on the radially inner and on the radially outer end winding 22. Since the linear conductor sections 33 of a double layer to be connected are located on different layers or planes, the connecting conductor section 35 also carries out the necessary change of position at the same time.

Figure 13:
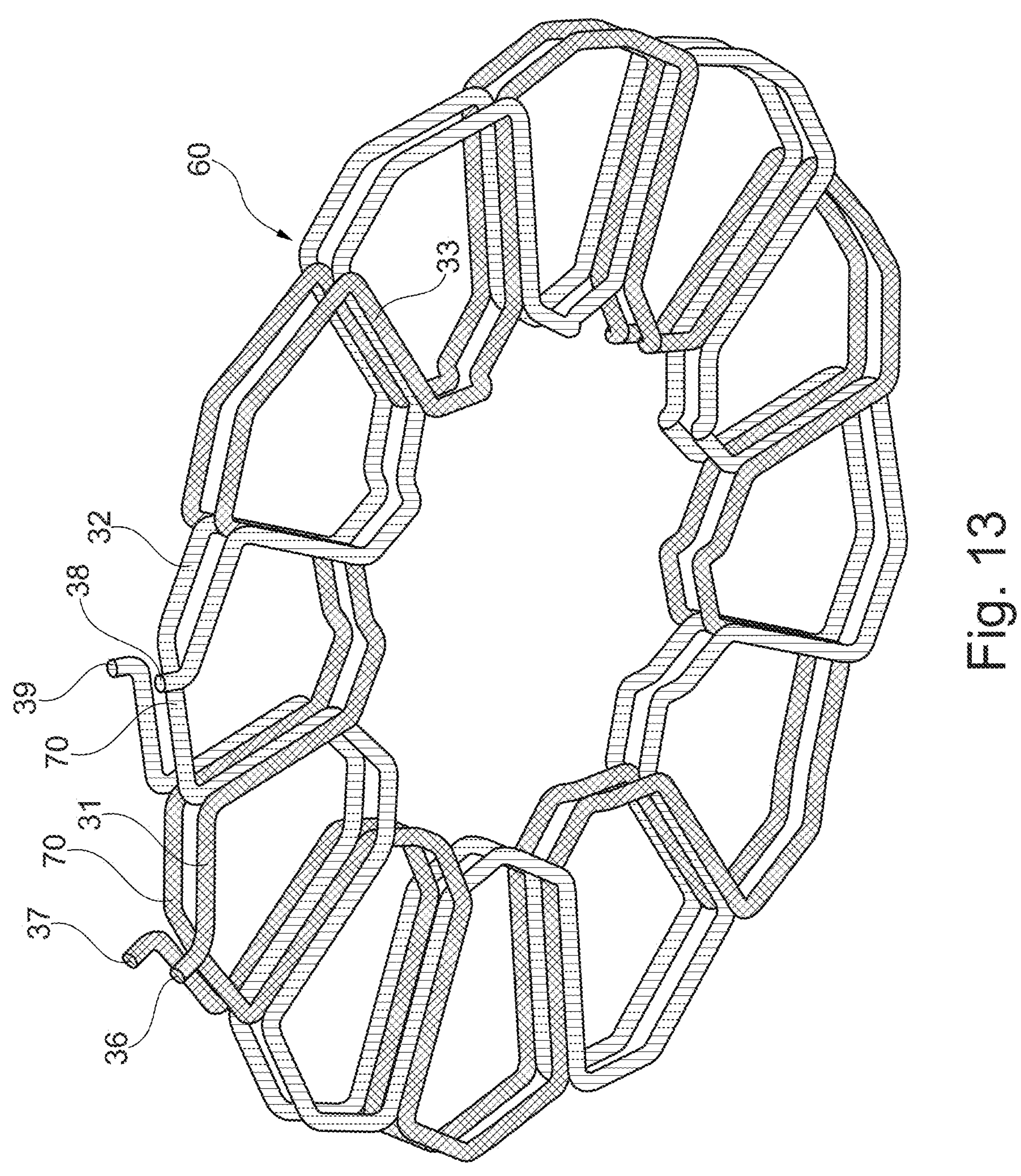
FIG. 13: shows the arrangement of the positive conductor and negative conductor.

To illustrate a conductor pair 30, the course of the first conductor 31 and the second conductor 32 is shown once again in FIG. 13. Here it can be seen that the linear conductor sections 33 overlap each other along the axial direction, so that they can be represented together in grooves. Furthermore, it can be seen that each of the two conductors 31, 32 shown here forms a transition section 70 or layer jump.

Figure 14:
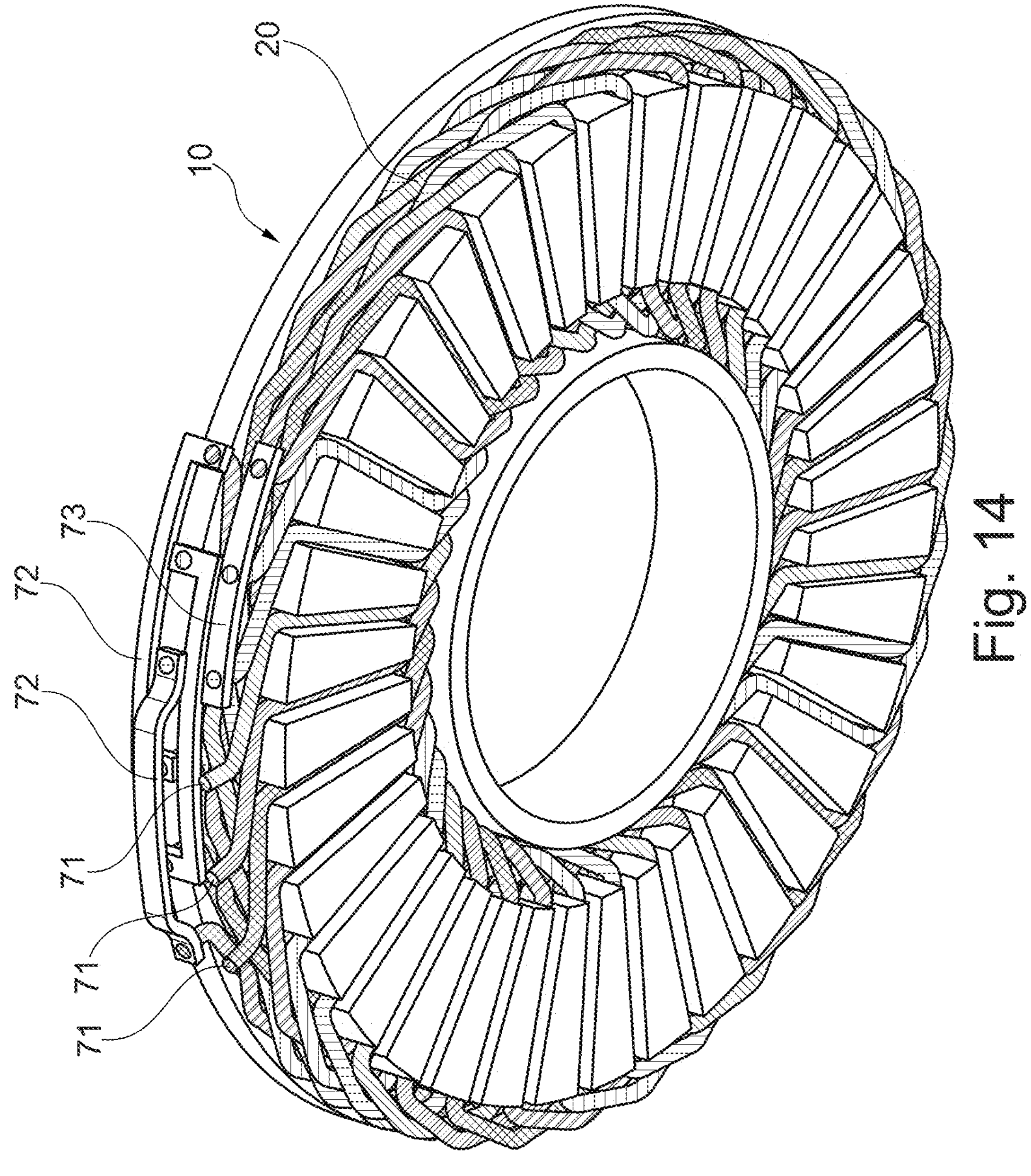
FIG. 14: shows the stator core with windings and electrical connections.

FIG. 14 shows the stator 10 with the winding 20 and a corresponding electrical wiring.

In this case, FIG. 14 shows an advantageous connection of the positive and negative windings, resulting in a star wiring of the windings with three connections for a connection to the power electronics. The phase supply or the connection to the power electronics takes place via the first connections of the positive windings, also called positive connections 71. The individual second connections of the positive windings are each connected individually to the second connections of the associated phase of the negative windings. The first connections 73 of the negative windings are interconnected to form a star wiring. This connection ensures that the positive and negative windings of a phase are connected in such a way that the conductor sections in the grooves have the same current direction. Compared to a hairpin winding, where a connection has to be made for the conductor in a groove, the wiring effort is reduced to four connection points per phase.

Alternatively, the connection shown can also be used for a series wiring 72. Deviating from the exemplary embodiments presented here, the stator designed according to the disclosure can also be designed for more or fewer than 3 phases.

FIGS. 15-26 relate to the embodiment of the method according to the disclosure for producing a winding of the stator.

The method described here relates to the production of windings in two double layers.

For this purpose, as shown in FIGS. 15-18, a first fin 80, a second fin 90 and a third fin 100 are aligned in such a way that their longitudinal axes run substantially parallel to one another. The first fin 80 is configured to produce windings of a first double layer. The third fin 100 is configured to produce windings of a second double layer.

The fins each have a geometry that favors the later process steps of bending into a flattened mat and bending into a circular shape.

Figures 15, 16:
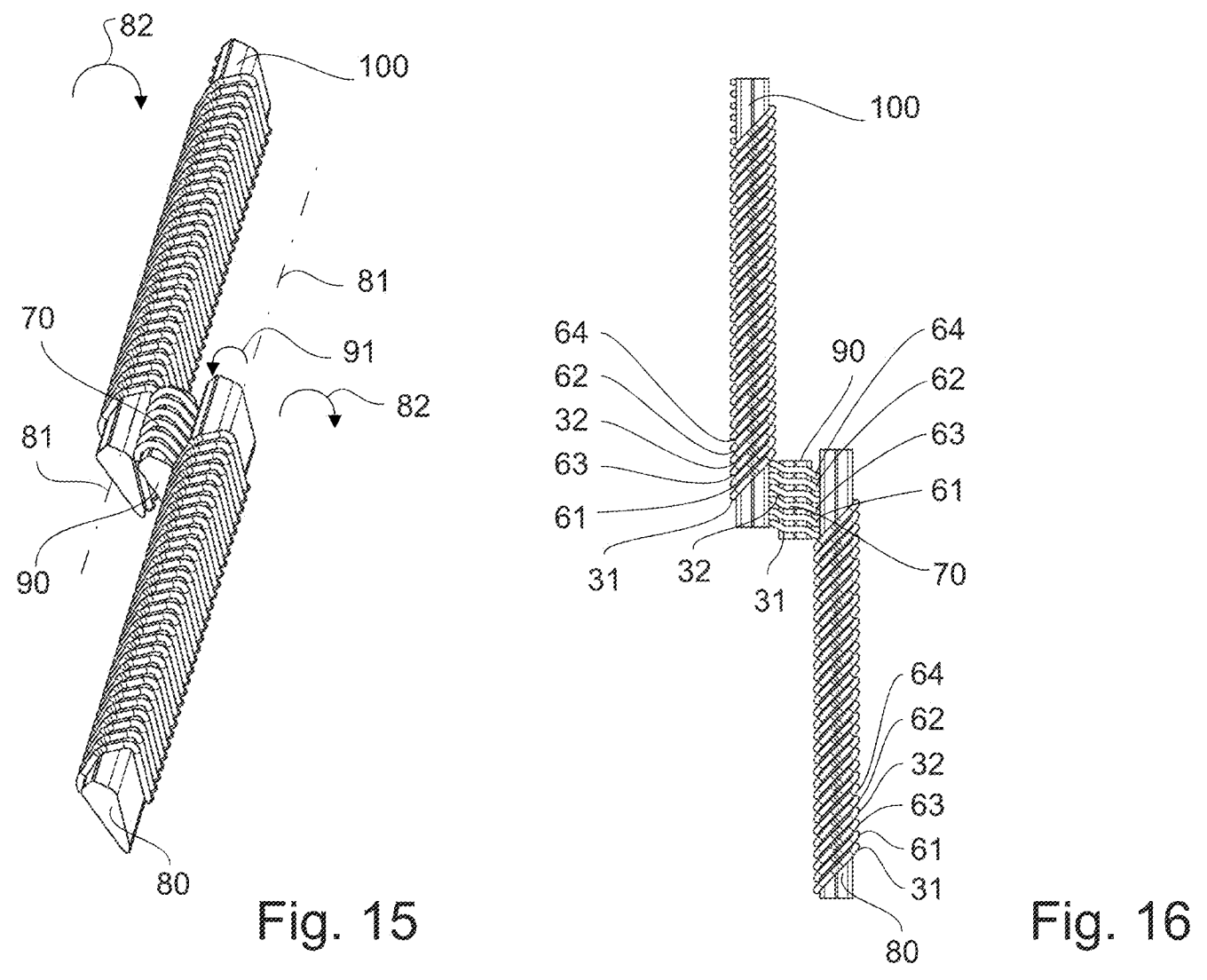

As FIGS. 15 and 16 illustrate in different views, around the first fin 80 along a first winding direction 82, here in the mathematically positive sense, the first conductor 31, the second conductor 32, the third conductor 61, the fourth conductor 62, the fifth conductor 63 and the sixth conductor 64 are wound. It makes sense to rotate and move the first fin 80 about its longitudinal axis 81 so that the following windings reach the first fin 80 next to windings that are already present.

With regard to the conductor pair, which comprises the first conductor 31 and the second conductor 32 and forms the first phase, it should be mentioned that the third conductor 61 and the fifth conductor 63 are located between the first conductor 31 and the second conductor 32 which, however, belong to the second phase and the third phase.

During the winding onto the first fin 80, the second fin 90 has not yet been brought into position, so that it does not interfere with the winding process on the first fin 80. The second fin 90 is not positioned until the required windings on the first fin 80 have been created. After completing the necessary number of windings, the second fin 90 is positioned next to the first fin 80 and the winding direction is reversed for approximately half a turn. In this way, the conductors are guided over the second fin 90 in a second winding direction 91 which runs in the opposite direction to the first winding direction 82.

By reversing the winding direction, the conductors are pre-bent for the layer jump. After that, said conductors are again wound up along the first winding direction 82 on the third fin 100, which is positioned after said half reverse rotation. If more double layers are required, the number of fins and the number of windings carried out is increased accordingly. If there are more than two layer jumps or transitions between double layers, additional second fins can be used. After the windings have been produced, the wound conductors can be pressed together to form a winding mat, so that this winding mat has approximately the same axial extent as the depth of the grooves in the stator body in which the winding(s) are to be accommodated. This winding mat can still be bent into an annular shape to facilitate insertion into the grooves of the stator core.

The implementation of the method is not necessarily restricted to the order of the steps mentioned above.

The use of the second fin 90 and the third fin 100 can be dispensed with in order to implement a winding mat with only one double layer.

The present method can also be used to produce windings for radial flux machines.

Figure 18:
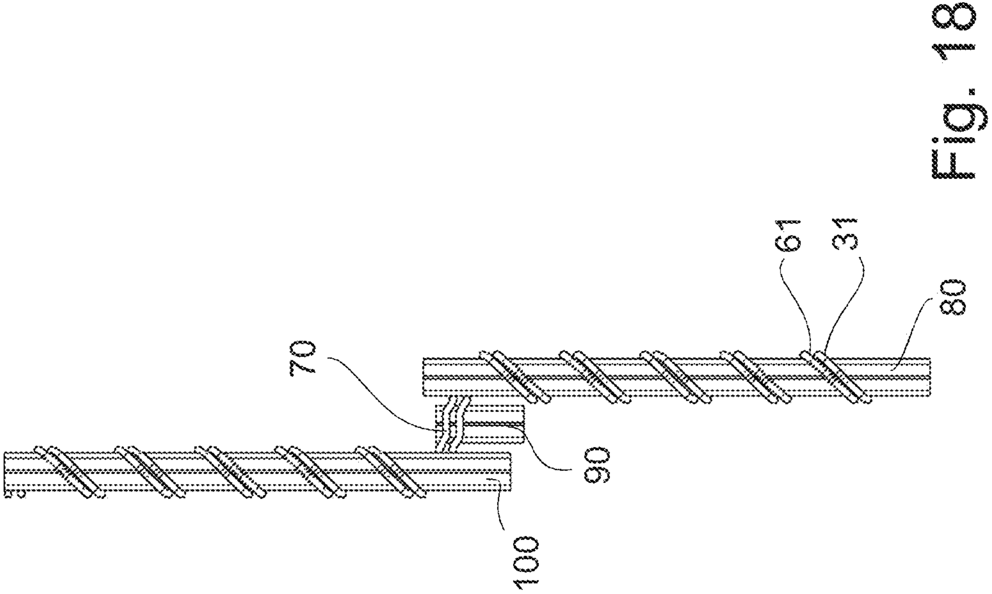
FIG. 18: shows fins with only one winding arranged thereon in a plan view.
Figure 17:
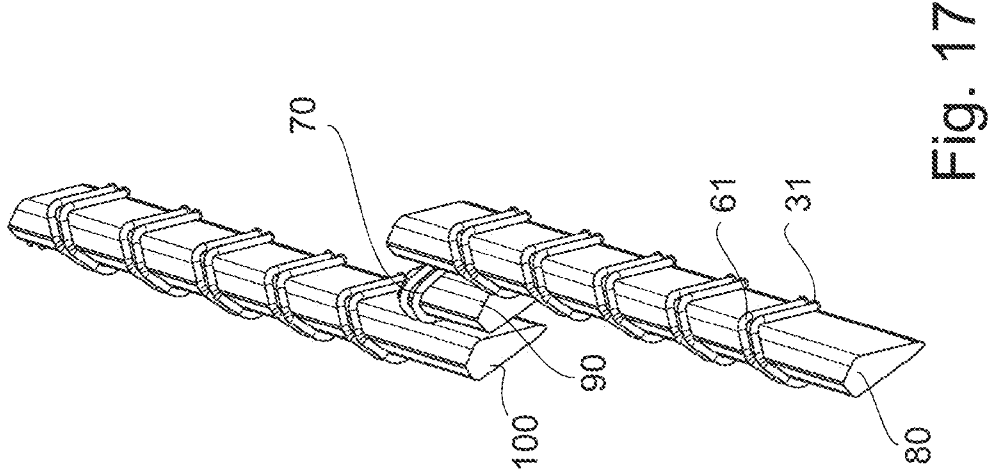
FIG. 17: shows fins with only one winding arranged thereon in a perspective view.

Fora simplified explanation of the method sequence, FIGS. 17 and 18 illustrate the winding processes using only two conductors of 2*n conductors as examples, namely the first conductor 31 and the third conductor 61.

It is also clearly visible here that the two transition sections 70 are formed by wrapping the second fin 90 with these conductors 31, 61.

Figure 20:
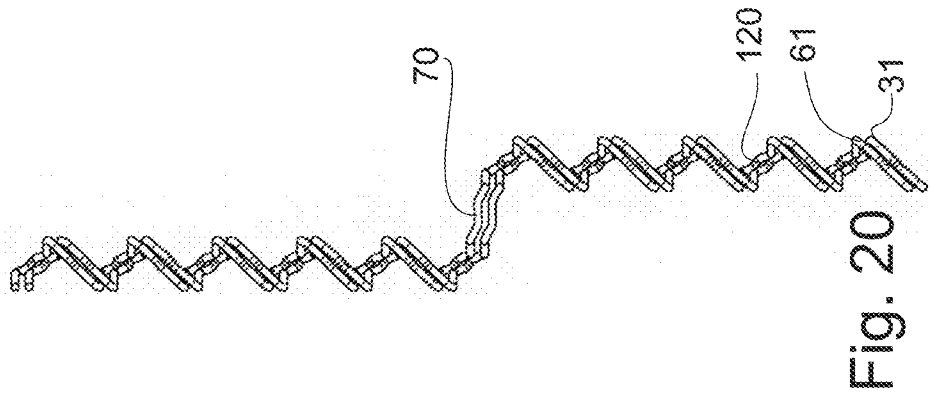
FIG. 20: shows the produced winding in a plan view.
Figure 19:
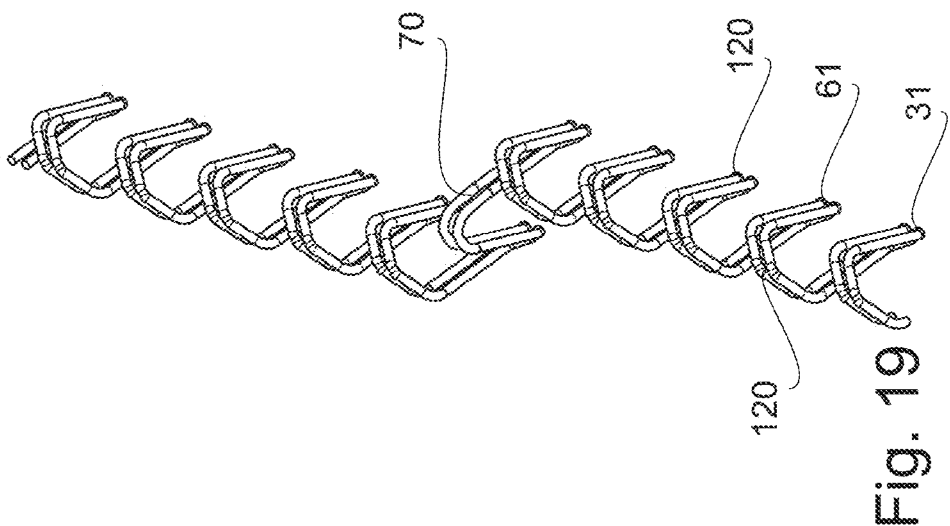
FIG. 19: shows the produced winding in a perspective view.

FIGS. 19 and 20 show the windings 20 produced after the fins have been withdrawn. It can be seen that the winding structure has been preserved and the bridging sections 70 are also formed.

Figure 21:
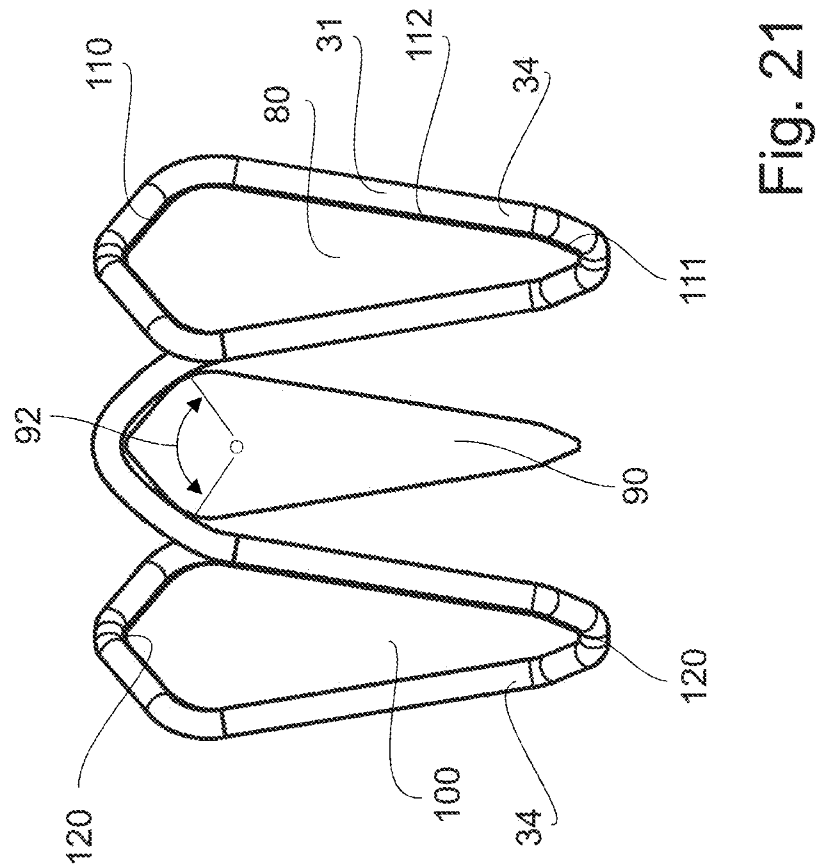
FIG. 21: shows the fins with windings in a front view.
Figures 22, 23:
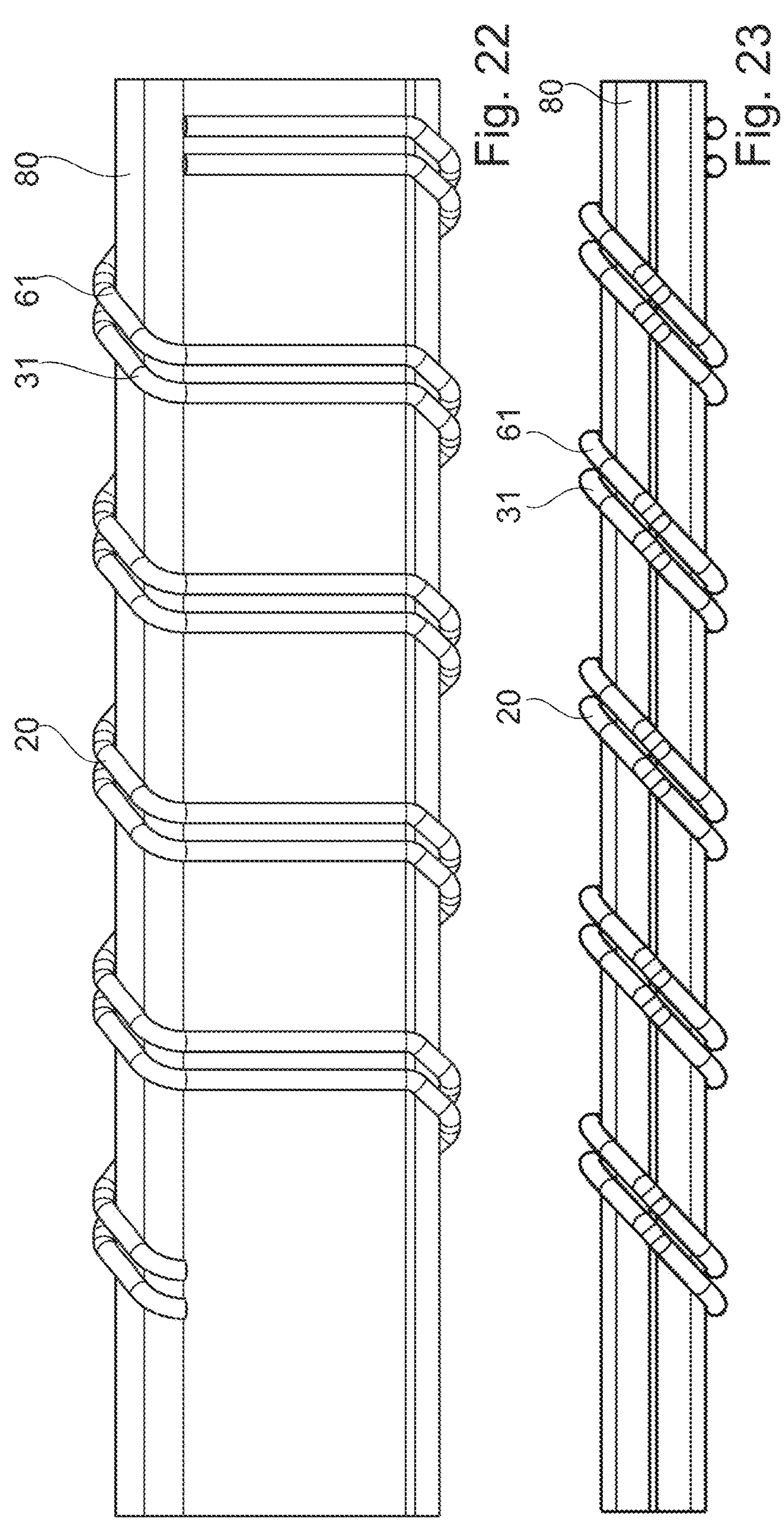
FIG. 22: shows a fin with winding in a view from the side.
FIG. 23: shows a fin with a winding in a plan view.

FIG. 21 shows the three fins 80, 90, 100 in a front view when the first conductor 31 is being wrapped. It can be seen that the first conductor 31 completely wraps around the first fin 80 and also the third fin 100. However, the second fin 90, which is located between the first fin 80 and the third fin 100, is only wrapped around at its upper side in a limited angle of wrap 92. Correspondingly, the wraps around the first fin 80 and the third fin 100 form wraps both on a first wrap side 110 and on a second wrap side 111 opposite this first wrap side 110. The first conductor 31 is guided substantially linearly on flat side surfaces 112 of the fins 80, 100.

It can be seen that, when the generated winding is equated with a harmonic oscillation, the first wrap side 110 forms an extreme value area 120 and the second wrap side 111 forms an opposite extreme value area 120.

In the extreme value areas 120 lying opposite one another, the winding is designed with a different width in order to adapt its shape to the fact that the distance between the grooves in the stator body is greater on the radial outer side than on the radial inner side.

FIGS. 22 and 23 again show the winding 20 around the first fin 80 in different views.

Figures 24, 25:
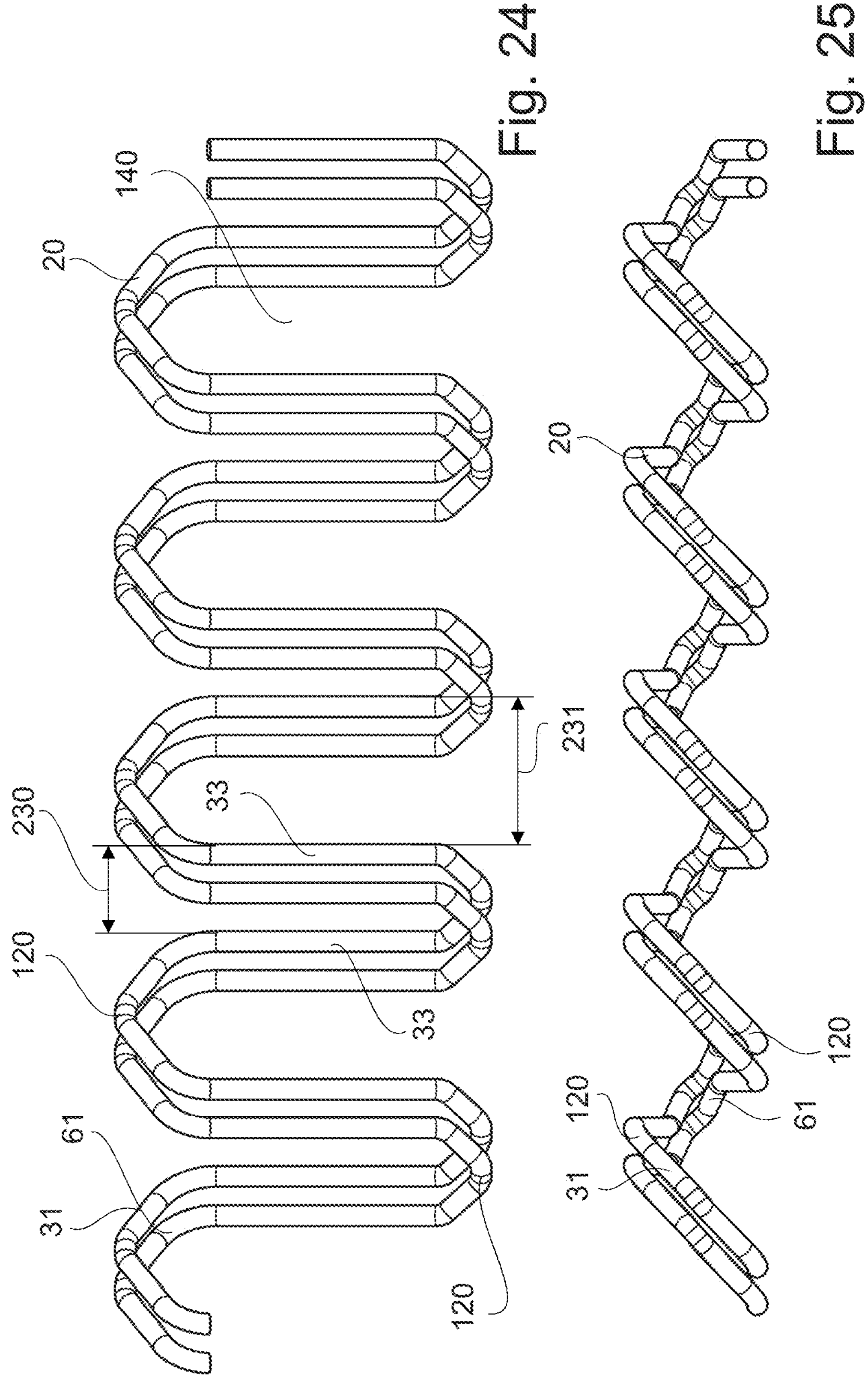
FIG. 24: shows the produced winding in a view from the side.
FIG. 25: shows the produced winding in a plan view.

FIG. 24 shows the winding 20 produced in a side view and FIG. 25 shows the winding 20 produced in a plan view. The extreme value areas 120 formed by the winding 20 can be seen very clearly in FIG. 24 in particular. It can also be seen that each of the two conductors 31, 61 forms meshes 140.

It can also be seen here that the distance between the linear conductor sections 33 within a shaft section is spaced apart from one another in an alternating manner by a first distance 230 and a second distance 231, wherein the second distance 231 is greater than the first distance 230. This takes account of the fact that the outer end windings have to bridge greater distances in the circumferential direction than the inner end windings. If this method is used for the stator windings of a radial flux machine, the distances for the two end windings are similar. These may change with the radius on which the winding layer lies, in that the fins used one after the other are designed with different widths for the individual double layers.

Figure 26:
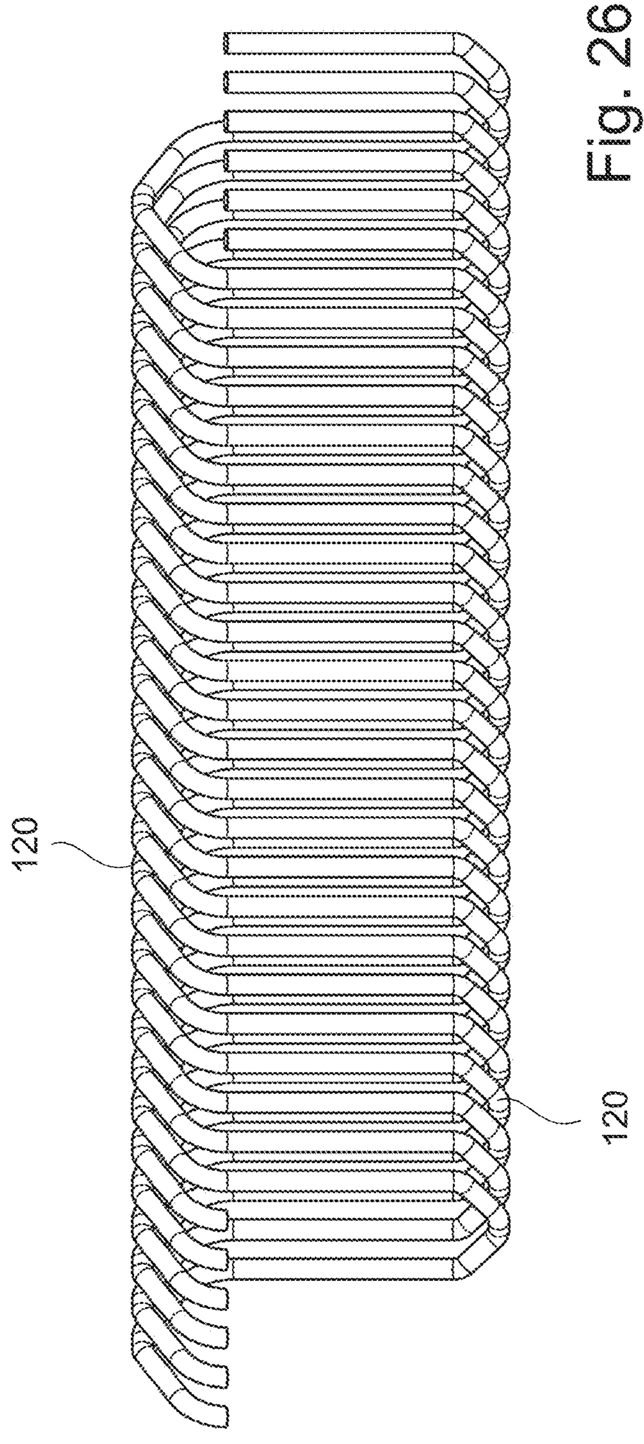
FIG. 26: shows the produced winding.

FIG. 26 shows a winding which includes all six conductors forming the three phases.

FIGS. 27-38 relate to another embodiment of the method for producing a winding of the stator.

Figures 27, 28:
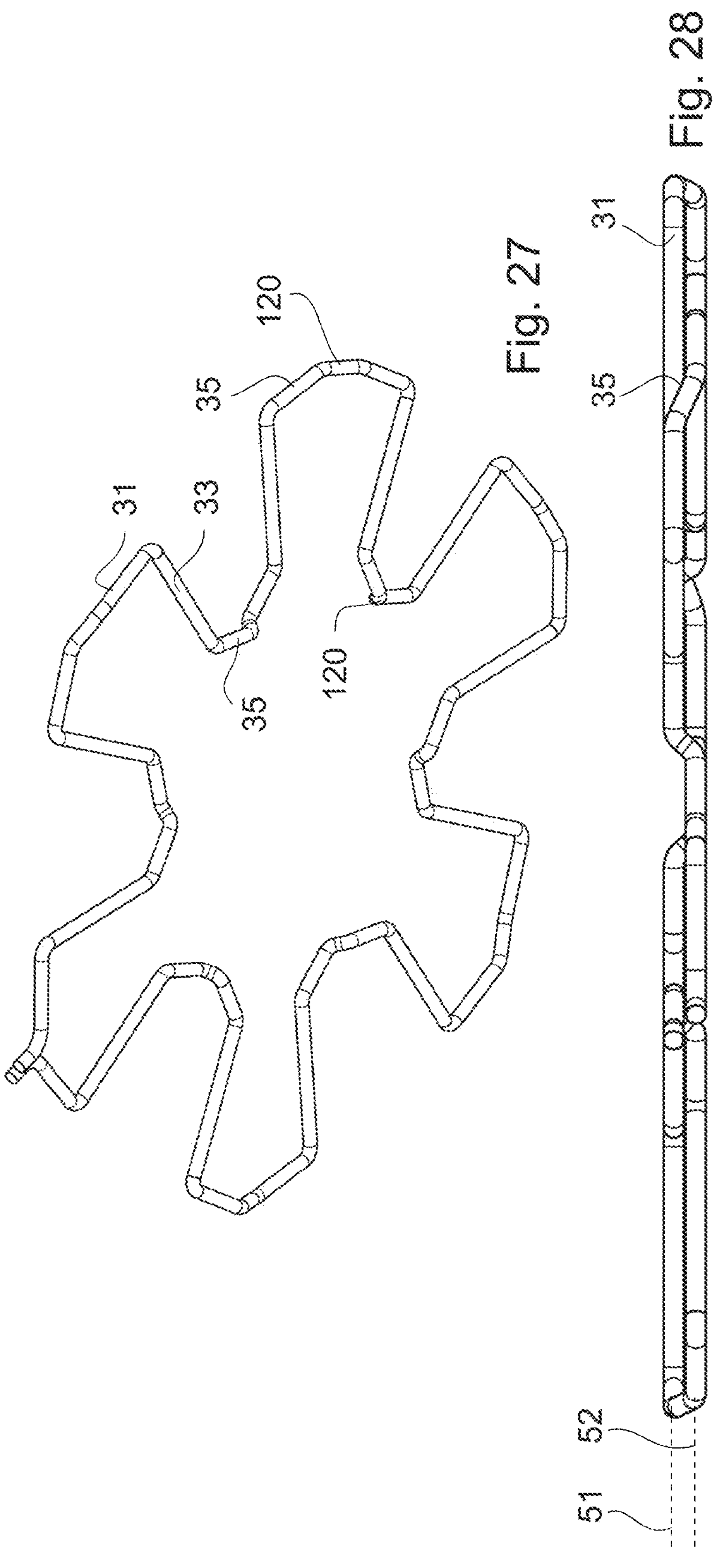
FIG. 27: shows a conductor element in a perspective view.
FIG. 28: shows the line element in a view from the side.

FIG. 27 shows the first conductor 31 in a double layer as an example. The individual sections of the first conductor 31 can be seen once again, namely the linear conductor sections 33 as well as the connecting conductor sections 35 and, in the sections that are radially furthest inside and outside, the extreme value areas 120.

In a side view, FIG. 28 clearly shows that the connecting conductor sections 35 ensure that the first conductor 31 runs alternately between a first plane 51 and a second plane 52.

Figure 29:
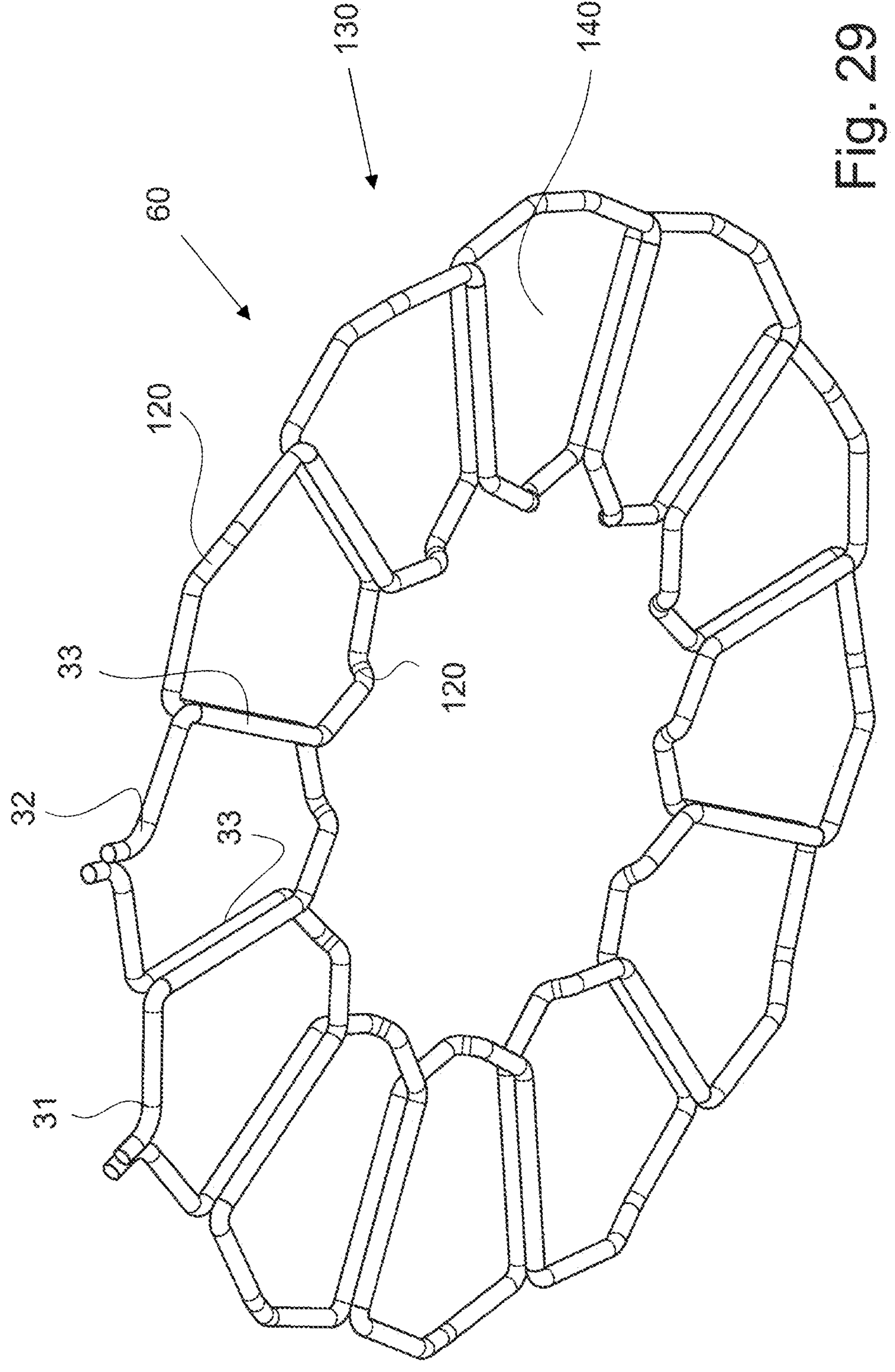
FIG. 29: shows two conductor elements in a perspective view.

FIG. 29 shows a braiding 130, which is formed by the first conductor 31 and the second conductor 32, so that together they result in a positive and a negative phase. These two conductors 31, 32 form a plurality of meshes 140. It can be seen that the two conductors 31, 32 are guided alternately in the two arrangement planes. This means that the linear conductor sections 33 of the two conductors 31, 32 are alternately arranged axially at the front and axially at the rear.

Figures 30, 31:
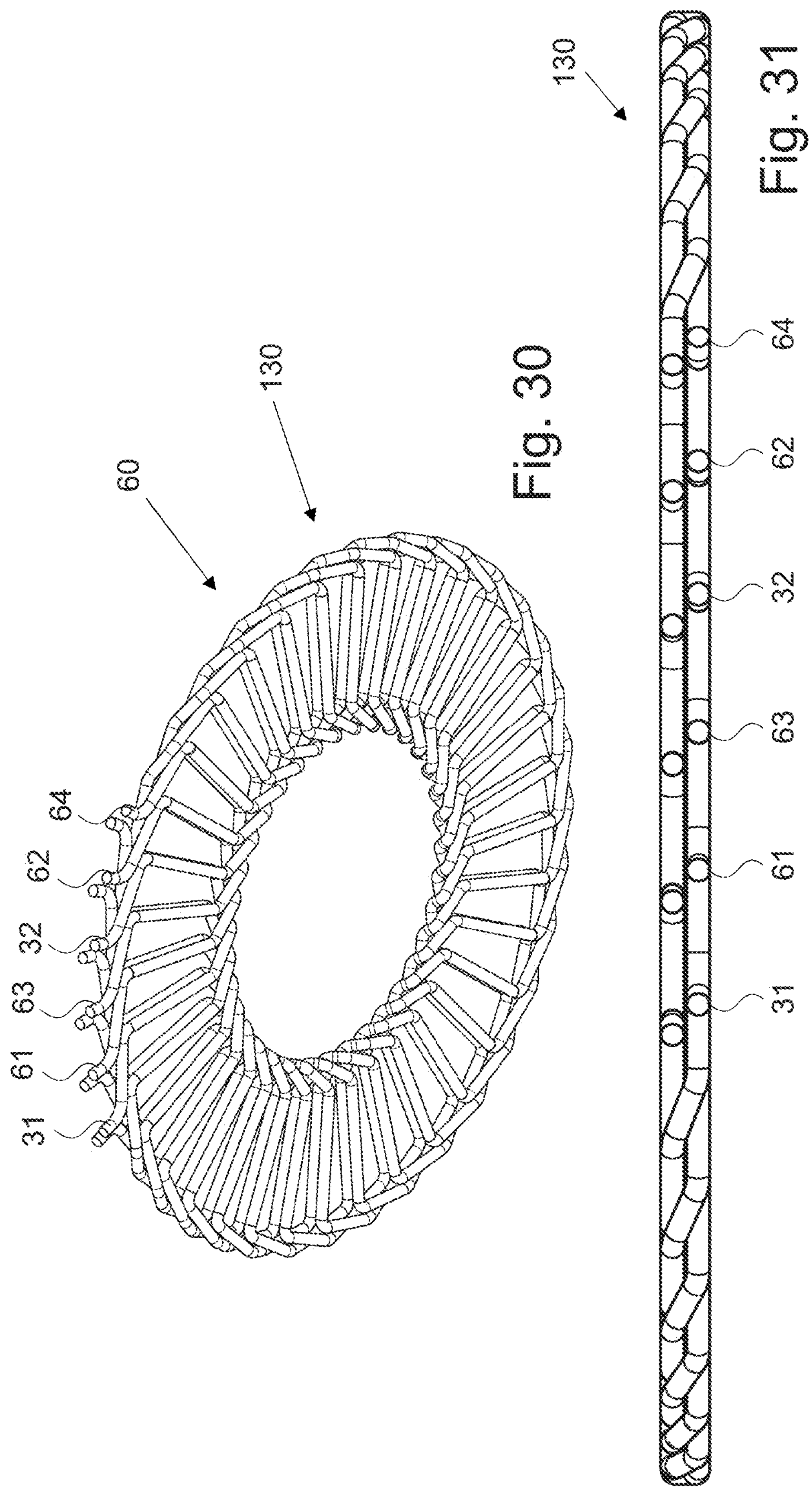
FIG. 30: shows a winding in a perspective view.
FIG. 31: shows the winding in a view from the side.

FIG. 30 now shows a braiding 130 that has been supplemented by a third conductor 61, a fourth conductor 62, a fifth conductor 63 and a sixth conductor 64 in the manner described for FIG. 29. These six conductors, set up for the connection of three phases, together form a complete double layer.

FIG. 31 shows this braiding 130 in a view from above.

The procedure for producing such a braiding will now be explained with reference to FIGS. 32-35.

Figures 32, 33:
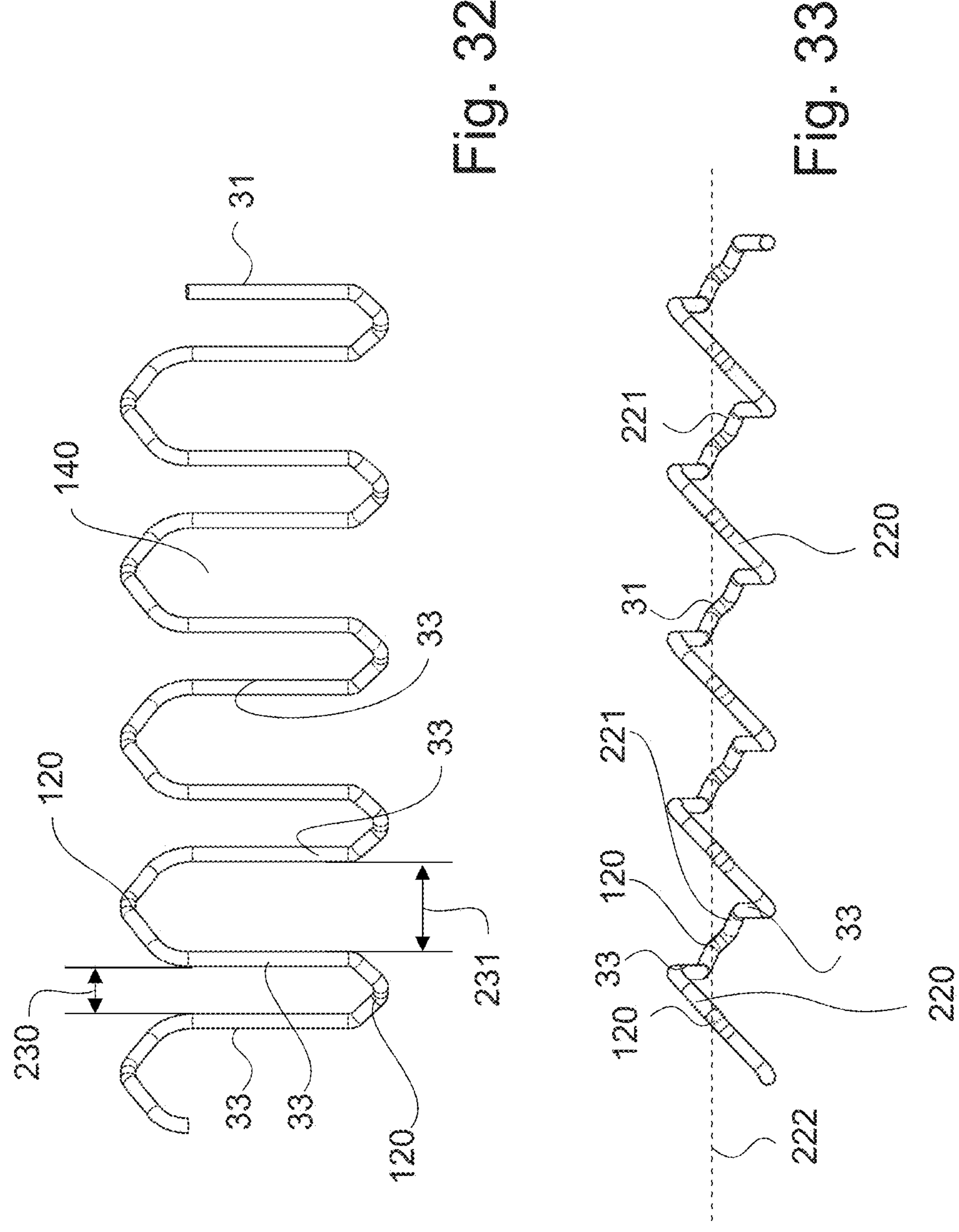
FIG. 32: shows a line element in a view from the side.
FIG. 33: shows a line element in a plan view.

First, as shown in FIG. 32, a first conductor 31 is provided that is in a meander shape or zigzag shape. It can be seen here that a first distance 230 and a second distance 231 are realized alternately between adjacent linear conductor sections 33, wherein the second distance 231 is greater than the first distance 230. This leads to different widths of the meshes 140 formed as a result, which are open at the top and bottom.

FIG. 33 makes it clear that the first conductor 31 shown here not only meanders in one plane, but also in the plane running perpendicular thereto, so that the first conductor 31 forms a rudimentary helical shape or a three-dimensional spiral. In a practical implementation, this three-dimensional spiral can also be designed to be significantly flatter than that shown in FIG. 33. In the extreme case, the conductor in FIG. 33 is already as flat as it was after it was inserted into the grooves of the stator. A central plane 222 leads through the extreme value areas 120. The course of the conductors in wave or spiral form already has features that favor the subsequent steps for forming into a winding mat. The conductor sections for the later inner end winding are shorter/smaller than the conductor sections for the later outer end winding, such that the distances 230, 231 between the conductor sections for the winding grooves are also of different sizes in alternation. The non-round shape of the three-dimensional helical form is formed in such a way that in the later process steps, the braiding is then flattened to produce the desired contour for the formation of the inner and outer winding heads, as well as the linear conductor sections for the winding grooves.

This means that the zigzag shape is three-dimensional, wherein, when the zigzag shape is equated with a harmonic oscillation, linear conductor sections 33 of the relevant conductor having a positive slope 220 and linear conductor sections of the relevant conductor having a negative slope 221 are respectively arranged on both sides outside a central plane 222 passing through extreme value areas 120.

Figures 34, 35:
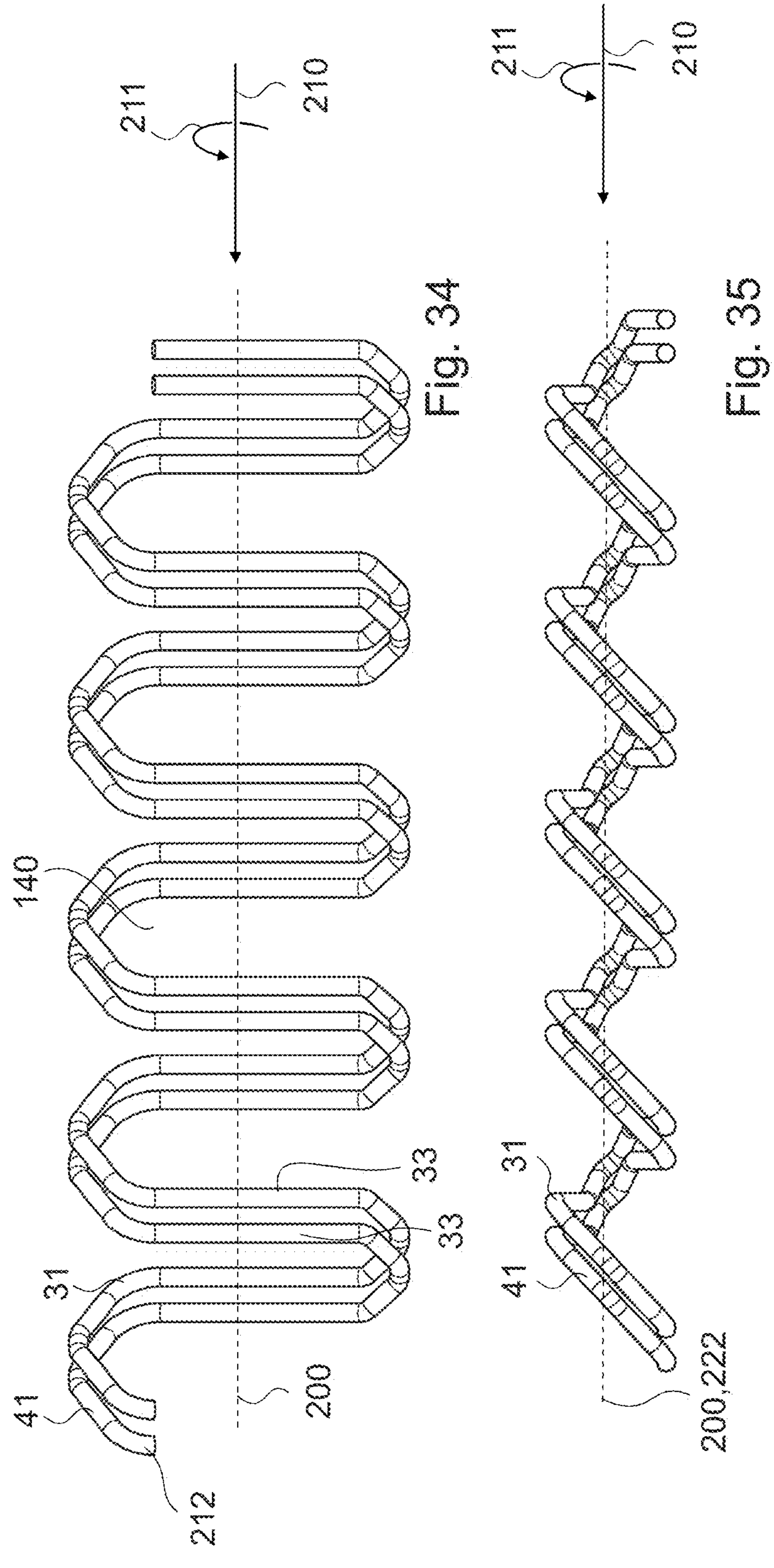
FIG. 34: shows two line elements connected to one another in a view from the side.
FIG. 35: shows the two interconnected line elements in a plan view.

The braiding is now created by providing a further conductor 41 of a double arrangement of conductors that has been preformed in substantially the same way as the first conductor 31. As indicated in FIGS. 34 and 35, the additional conductor 41 is then moved relative to the first conductor 31 with a combination movement that combines a translational movement component 210 with a rotational movement component 211, so that the additional conductor 41 rotates about its longitudinal axis 200 and is simultaneously moved forward along the longitudinal axis 200 so that its conductor tip 212 penetrates through the shaft of the first conductor 31 in each case. As a result, the further conductor 41 meanders through the meshes 140 of the first conductor 31, in a manner similar to the production of a wire mesh fence, such that these result in a plurality of spatial spirals twisted into one another.

As can be seen from FIG. 34, the linear conductor sections 33 also overlap one another.

Figure 36:
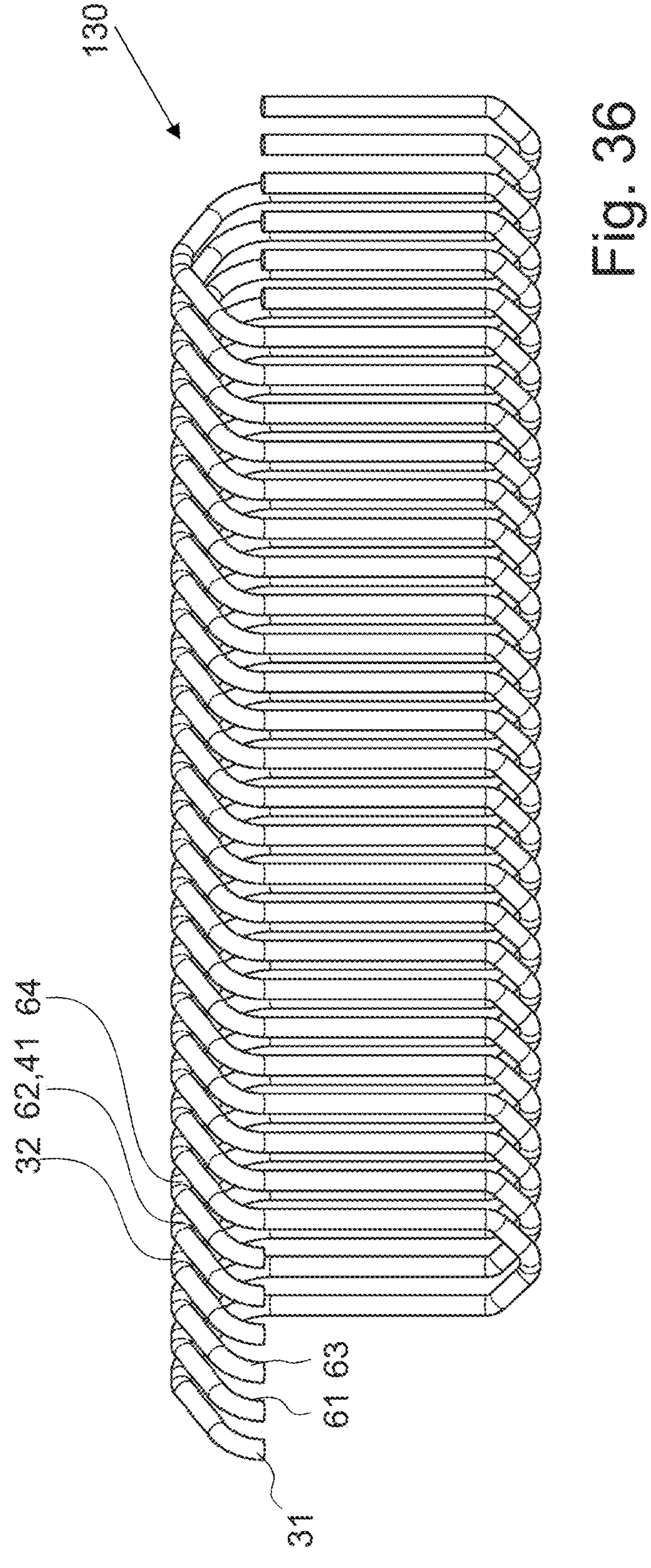
FIG. 36: shows the produced winding.

FIG. 36 shows a braiding 130 formed from the first conductor 31, a second conductor 32, a third conductor 61, a fourth conductor 62, a fifth conductor 63 and a sixth conductor 64 that have been engaged in accordance with the above procedure. The fourth conductor 62 and the first conductor 31 have been screwed into one another in the manner described. This means that the fourth conductor 62 corresponds to the further conductor 41.

The other conductors shown here, i.e., the second conductor 32, the third conductor 61, the fifth conductor 63 and the sixth conductor 64 have in turn been connected to one another according to the present method in the order shown.

Accordingly, this provides three conductor pairs for connection to three phases that are intertwined.

Deviating from the embodiment shown here, more or fewer conductor pairs can of course be intertwined to connect the phases.

After the production of this braiding 130, this braiding 130 still has to be bent into a circular shape. In addition, the three-dimensional structures of the individual conductors of this braiding can also be reduced in the axial extent, so that they result in a flat mat that requires less axial space when integrated between the stator teeth.

Figures 37, 38:
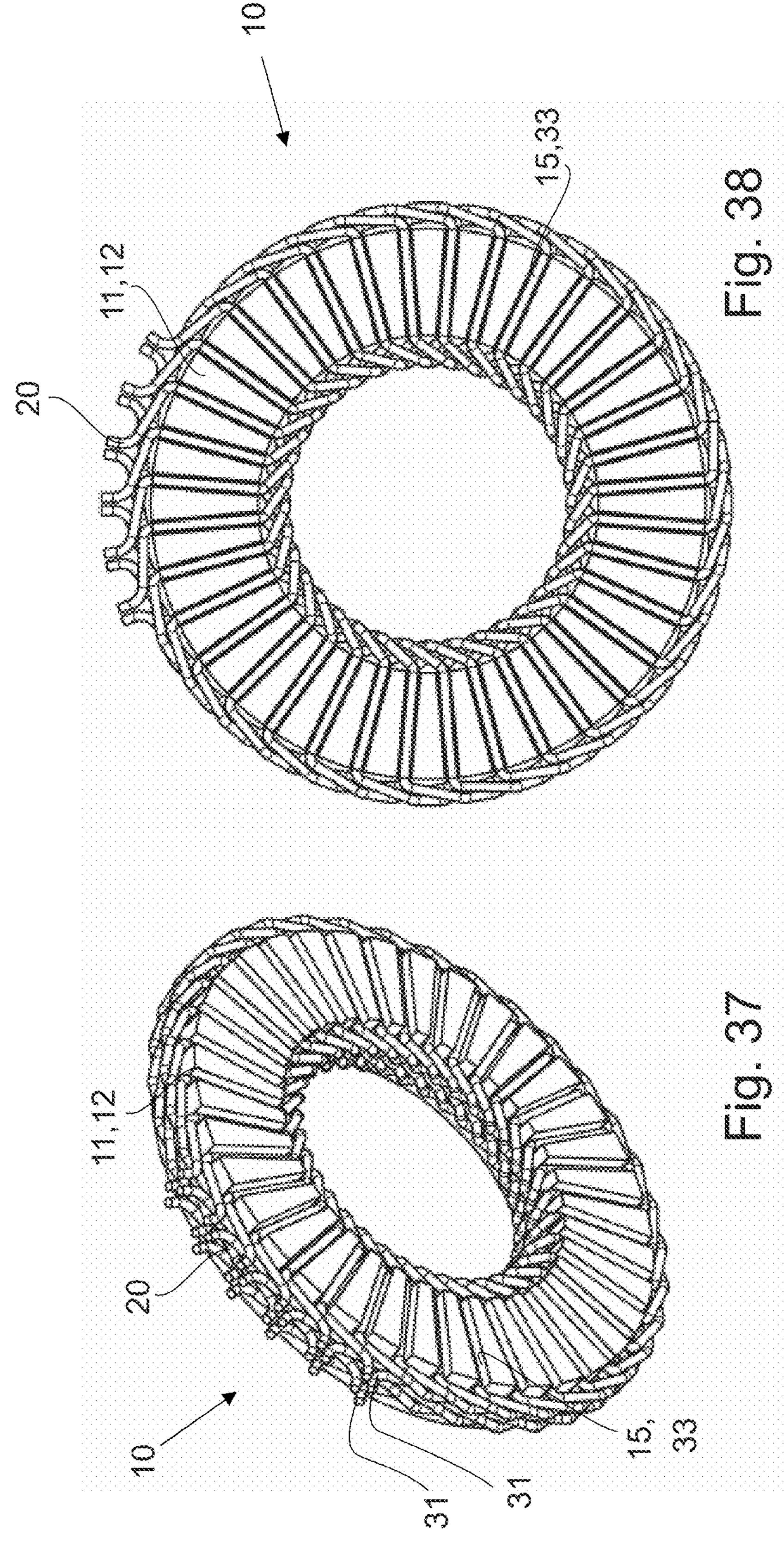
FIG. 37: shows a stator core with winding in a perspective view.
FIG. 38: shows a stator core with winding in a front view.

However, the method is not limited to the order of the individual steps described above. FIGS. 37 and 38 each show a stator 10 in the grooves 15 of which the linear conductor sections 33 of a braiding made of the six conductors mentioned above are arranged.

The stator 10 shown here has the special feature that it comprises the six conductors in two double layers; however, these are not connected to one another by transition sections, as shown in FIG. 5. This is evident from the designation of two first conductors 31 in FIG. 37, for example.

The method for producing a winding for a stator of an electrical rotating machine, and the stator itself, as well as the method for producing the stator and the electric rotating machine provide solutions that make it possible to produce the winding and correspondingly also the stator comprising the winding, as well as the electric rotating machine comprising the stator, at low cost and with only a small time requirement.

LIST OF REFERENCE SYMBOLS

1 Axial flux machine
2 Rotor
10 Stator
11 Stator body
12 Stator tooth
13 Group of stator teeth
14 Circumferential direction
15 Groove
16 Depth of the groove
20 Winding
21 Winding direction
22 End winding
30 Conductor pair
31 First conductor
32 Second conductor
33 Linear conductor section
34 Wrap
35 Connecting conductor section
36 First connection of the positive conductor
37 Second connection of the positive conductor
38 First connection of the negative conductor
39 Second connection of the negative conductor
40 Common connection area
41 Further conductor
51 First plane
52 Second plane
53 Third plane
54 Fourth plane
60 Double layer
61 Third conductor
62 Fourth conductor
63 Fifth conductor
64 Sixth conductor
70 Transition section
71 Positive connections
72 Connection for series wiring
73 Connection for star wiring
80 First fin
81 Longitudinal axis
82 First winding direction
90 Second fin
91 Second winding direction
92 Angle of wrap
100 Third fin
110 First wrap side
111 Second wrap side
112 Flat lateral face
120 Extreme value area
130 Braiding
140 Meshes
200 Longitudinal axis of the second conductor
210 Translational movement component
211 Rotary movement component
212 Conductor tip
220 Section with positive slope
221 Section with negative slope
222 Central plane
230 First distance
231 Second distance

The invention claimed is:

1. A method for producing a winding for a stator of an electric rotating machine, the method comprising:

winding a plurality of conductors on a first fin having a wedge shape profile along a first winding direction so that the conductors loop around the first fin; and removing the first fin;

bending the plurality of conductors along a second winding direction opposite to the first winding direction on a second fin after reaching a predetermined number of loops around the first fin such that the plurality of conductors partially wrap around the second fin with connecting transition sections;

winding the plurality of conductors on a third fin along the first winding direction so that the conductors loop around the third fin, and removing the fins, wherein the first fin and the third fin each have a cross-sectional shape having a first wrap side and a second wrap side, wherein the first wrap side is longer than the second wrap side, and the first wrap side is opposite the second wrap side;

wherein opposite side surfaces of the first fin and the third fin extend between the first wrap side and the second wrap side and converge towards each other in a direction towards the second wrap side.

2. The method for producing a winding according to claim 1, wherein the conductors are bent on the second fin with an angle of wrap on the second fin of 100° to 220°.

3. The method for producing a winding according to claim 1, further comprising deforming the connecting transition sections to position the loops formed around the first fin and the loops formed around the third fin between two mutually parallel planes.

4. The method for producing a winding according to claim 3, further comprising, after positioning the loops of the conductors between two planes running parallel to one another, reducing in thickness a resulting braiding in a direction perpendicular to the planes or bending the resulting braiding to make it circular.

5. A stator of an electric rotating machine, comprising a stator body which has a plurality of stator teeth arranged along a circumferential direction and grooves formed between the stator teeth, and conductor sections of a winding produced according to the method of claim 1 arranged in the grooves, wherein at least one conductor section of the conductors is arranged in a respective groove, and wherein the conductors, deviating from a winding direction extending substantially in the circumferential direction, meander in a radial direction in a direction extending substantially perpendicularly to the circumferential direction and each wrap around a group of stator teeth with a respective wrap formed thereby.

6. The stator according to claim 5, wherein the stator is a stator of an electric rotating machine having a rotor.

7. The stator according to claim 6, wherein the conductors are connected in a star connection to corresponding contacts carrying current of the relevant phase.

8. The method for producing a winding according to claim 1, wherein the first wrap side and the second wrap side correspond to a wide end and a narrow end, respectively, of the first fin having the wedge shape profile.

9. The method for producing a winding according to claim 1, wherein the first fin and the third fin have an axis of symmetry extending through the first wrap side and the second wrap side, and the opposite side surfaces extend at an oblique angle relative to the axis of symmetry.

10. A method for producing a stator of an electric rotating machine having providing a stator body having a plurality of stator teeth arranged along a circumferential direction and grooves formed between the stator teeth, and a winding produced by winding a plurality of conductors on a having a wedge shape profile first fin along a first winding direction so that the conductors loop around the first fin, and removing the first, fin, arranging conductor sections of the conductors in the grooves to form at least a portion of the winding of the stator, wherein at least one conductor section of the conductors is arranged in a respective groove such that the conductors, deviating from a winding direction extending substantially in the circumferential direction meander in a radial direction in a direction substantially perpendicular to the circumferential direction and wrap around a group of stator teeth with a respective wrap formed thereby, bending the plurality of conductors along a second winding direction opposite to the first winding direction on a second fin after reaching a predetermined number of loops around the first fin such that the plurality of conductors partially wrap around the second fin with connecting transition sections, winding the plurality of conductors on a third fin along the first winding direction so that the conductors loop around the third fin, and removing the fins, wherein the first fin and the third fin each have a cross-sectional shape having a first wrap side and a second wrap side, wherein the first wrap side is longer than the second wrap side, and the first wrap side is opposite the second wrap side, wherein opposite side surfaces of the first fin and the third fin extend between the first wrap side and the second wrap side and converge towards each other in a direction towards the second wrap side.

11. The method for producing a stator according to claim 10, wherein the conductors are bent on the second fin with an angle of wrap (on the second fin of 100° to 220°.

12. The method for producing a winding according to claim 10, further comprising deforming the connecting transition sections to position the loops formed around the first fin and the loops formed around the second fin between two mutually parallel planes.

13. The method for producing a winding according to claim 12, further comprising, after positioning the loops of the conductors between two planes running parallel to one another, reducing in thickness a resulting braiding in a direction perpendicular to the planes or bending the resulting braiding to make it circular.

14. The method for producing a winding according to claim 10, wherein the first wrap side and the second wrap side correspond to a wide end and a narrow end, respectively, of the first fin having the wedge shape profile.

15. The method for producing a winding according to claim 10, wherein the first fin and the third fin have an axis of symmetry extending through the first wrap side and the second wrap side, and the opposite side surfaces extend at an oblique angle relative to the axis of symmetry.

* * * * *